US012131077B2

(12) United States Patent
Tashiro

(10) Patent No.: US 12,131,077 B2
(45) Date of Patent: Oct. 29, 2024

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Hideyasu Tashiro, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/135,234

(22) Filed: Apr. 17, 2023

(65) Prior Publication Data
US 2023/0342092 A1    Oct. 26, 2023

(30) Foreign Application Priority Data
Apr. 20, 2022   (JP) ................. 2022-069592

(51) Int. Cl.
*G06F 15/00*     (2006.01)
*B41J 2/045*     (2006.01)
*G06F 3/12*      (2006.01)

(52) U.S. Cl.
CPC .......... *G06F 3/1208* (2013.01); *B41J 2/0451* (2013.01); *B41J 2/04586* (2013.01); *G06F 3/121* (2013.01); *G06F 3/1234* (2013.01); *G06F 3/1252* (2013.01)

(58) Field of Classification Search
None
See application file for complete search history.

(56) References Cited

U.S. PATENT DOCUMENTS

| 2016/0052300 A1* | 2/2016 | Ueshima | B41J 2/21 347/16 |
| 2017/0057266 A1* | 3/2017 | Kimura | B41J 29/393 |
| 2021/0303950 A1* | 9/2021 | Takesue | G06K 15/102 |

FOREIGN PATENT DOCUMENTS

JP    2009-184144 A    8/2009

OTHER PUBLICATIONS

Machine translation of Japanese Patent Document No. 2009-184144 to Arasaki, Aug. 20, 2009 (Year: 2009).*

* cited by examiner

*Primary Examiner* — Mark R Milia
(74) *Attorney, Agent, or Firm* — Venable LLP

(57) ABSTRACT

An image processing apparatus comprises an obtainment unit configured to obtain a density unevenness image in which uneven density caused by a nozzle in a nozzle row for discharging ink occurs in an image for printing, and a determination unit configured to determine whether a printing position of the image for printing needs to be moved based on a feature amount in each of the image for printing and the density unevenness image.

16 Claims, 21 Drawing Sheets

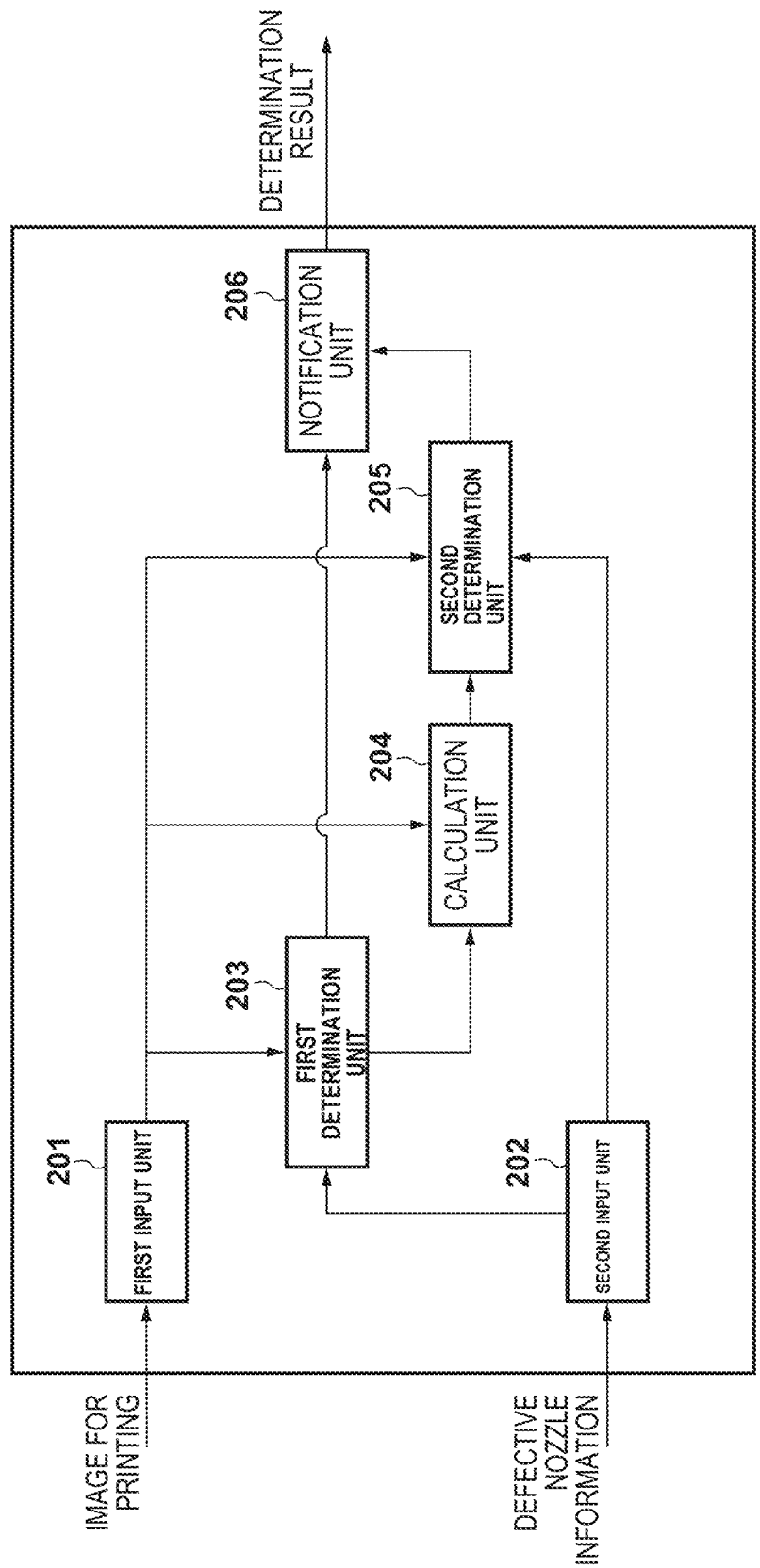

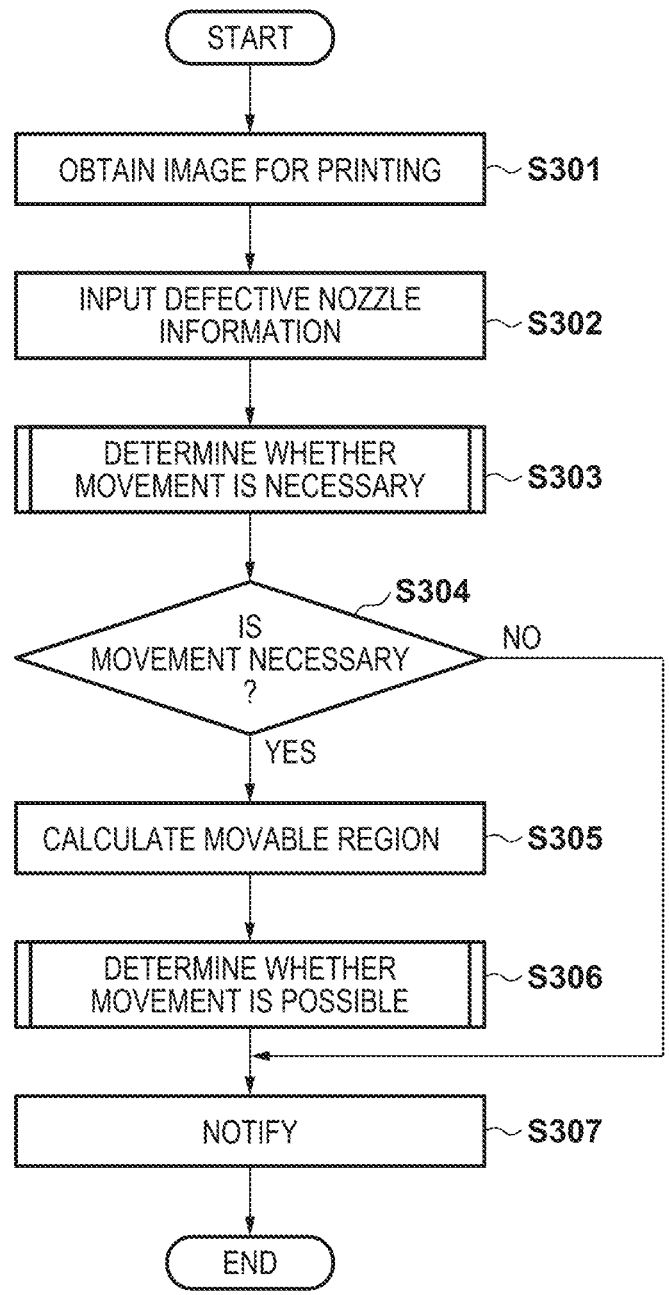

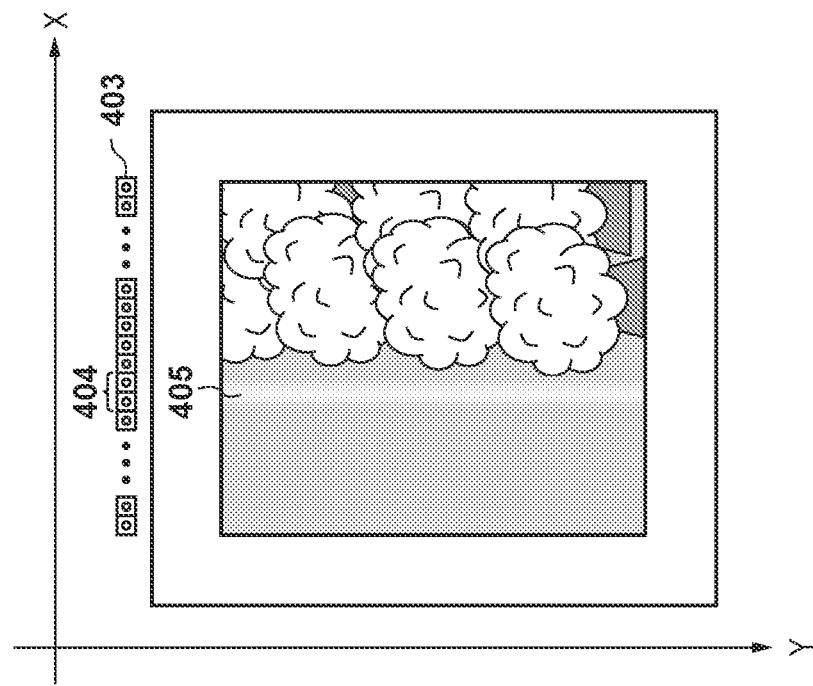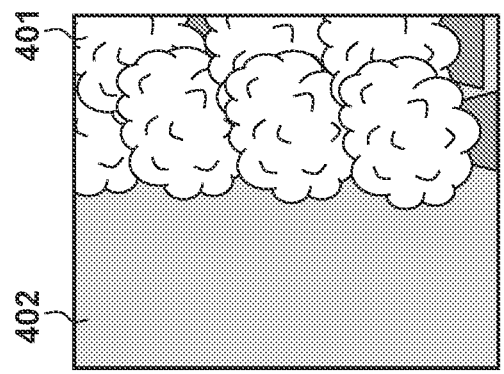

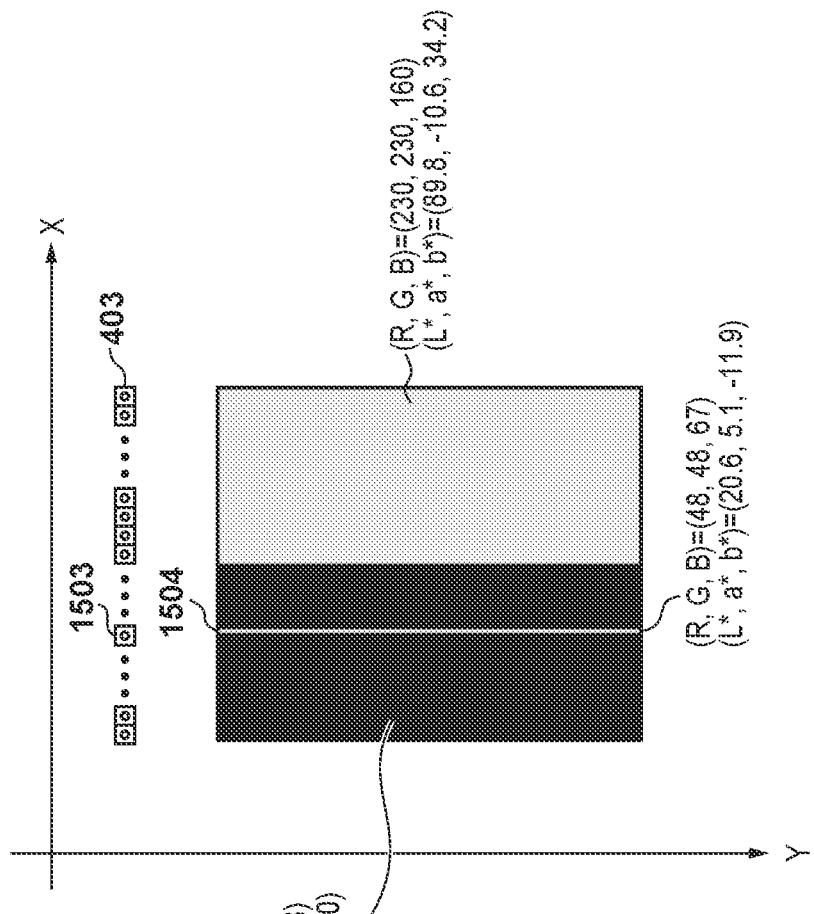
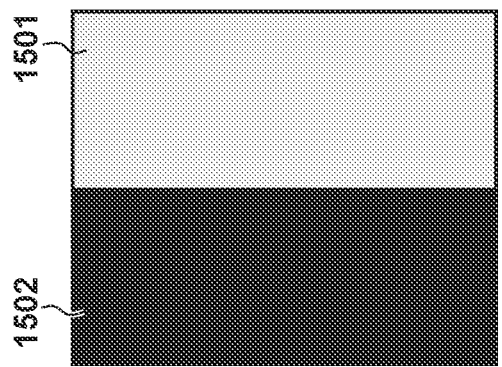

180° ROTATION

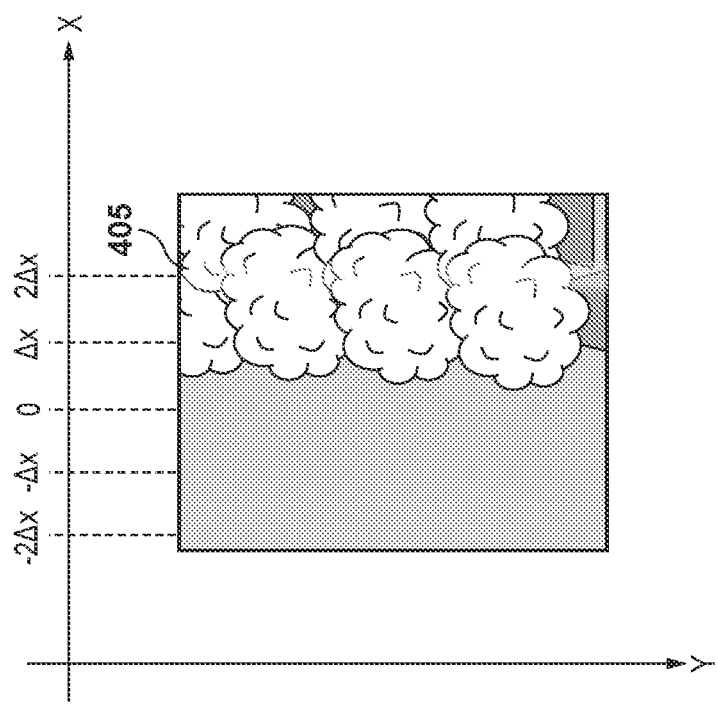

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing technique related to printing.

Description of the Related Art

In a single-pass printing method in which an image is printed on a printing sheet by scanning a printhead only once relative to the printing sheet, an image can be printed at a higher speed than in a multi-pass printing method in which an image is printed by scanning the printhead a plurality of times over the printing sheet.

However, in cases where the printhead is an inkjet printhead, ink discharge defects may occur due to mixing of air bubbles into the nozzles of the inkjet printhead or clogging of the nozzles of the inkjet printhead. In particular, in the single-pass printing method, such a discharge defect is visible in the image on the printing sheet as a streak-like defect in the direction of relative scanning. For this reason, conventionally, in an inkjet printing method printing apparatus, every certain number of printed sheets or each time a nozzle discharge defect is detected by a discharge failure inspection chart or the like, a nozzle recovery operation such as nozzle density correction or head cleaning is performed. However, there is a problem that productivity is reduced when such an operation is performed.

In Japanese Patent Laid-Open No. 2009-184144, a method for determining, in a case where a defective discharge nozzle is detected, whether it can be avoided by moving a sheet and changing the orientation, and in cases where avoidance is possible, reducing the frequency of nozzle recovery operations by moving an image for printing in order to avoid a reduction of a productivity accompanying a nozzle recovery operation, is disclosed.

However, in the method disclosed in Japanese Patent Laid-Open No. 2009-184144, since it is determined whether or not a movement of the image for printing that will avoid the usage of a detective discharge nozzle is possible, there are cases in which it is difficult to move the image for printing, and the frequency of nozzle recovery operations is not sufficiently reduced depending on the position of a detected defective discharge nozzle.

SUMMARY OF THE INVENTION

The present invention provides a technique for determining whether or not an image for printing needs to be moved to a position where a defect that can occur due to a defective nozzle is not conspicuous.

According to the first aspect of the present invention, there is provided an image processing apparatus, comprising: an obtainment unit configured to obtain a density unevenness image in which uneven density caused by a nozzle in a nozzle row for discharging ink occurs in an image for printing; and a determination unit configured to determine whether a printing position of the image for printing needs to be moved based on a feature amount in each of the image for printing and the density unevenness image.

According to the second aspect of the present invention, there is provided an image processing method that an image processing apparatus performs, the image processing method comprising: obtaining a density unevenness image in which uneven density caused by a nozzle in a nozzle row for discharging ink occurs in an image for printing; and determining whether a printing position of the image for printing needs to be moved based on a feature amount in each of the image for printing and the density unevenness image.

According to the third aspect of the present invention, there is provided a non-transitory computer-readable storage medium storing a computer program to cause a computer to function as: an obtainment unit configured to obtain a density unevenness image in which uneven density caused by a nozzle in a nozzle row for discharging ink occurs in an image for printing; and a determination unit configured to determine whether a printing position of the image for printing needs to be moved based on a feature amount in each of the image for printing and the density unevenness image.

Further features of the present invention will become apparent from the following description of exemplary embodiments with reference to the attached drawings.

BRIEF DESCRIPTION OF THE DRAWINGS

FIG. 2 is a block diagram illustrating an exemplary functional configuration of an image processing apparatus 100.

FIG. 3 is a flowchart of processing performed by the image processing apparatus 100 for determining whether or not a printing position of an image for printing needs to be moved and whether or not the printing position can be moved.

FIGS. 4A and 4B are views illustrating an image for printing and an example of a defect that occurred due to defective nozzles.

FIGS. 15A and 15B are views illustrating an image for printing and an example of a defect that occurred due to a defective nozzle.

FIGS. 25A and 25B are views illustrating examples of defect images in which defects are not conspicuous on both front and back surfaces.

DESCRIPTION OF THE EMBODIMENTS

Figure 1:
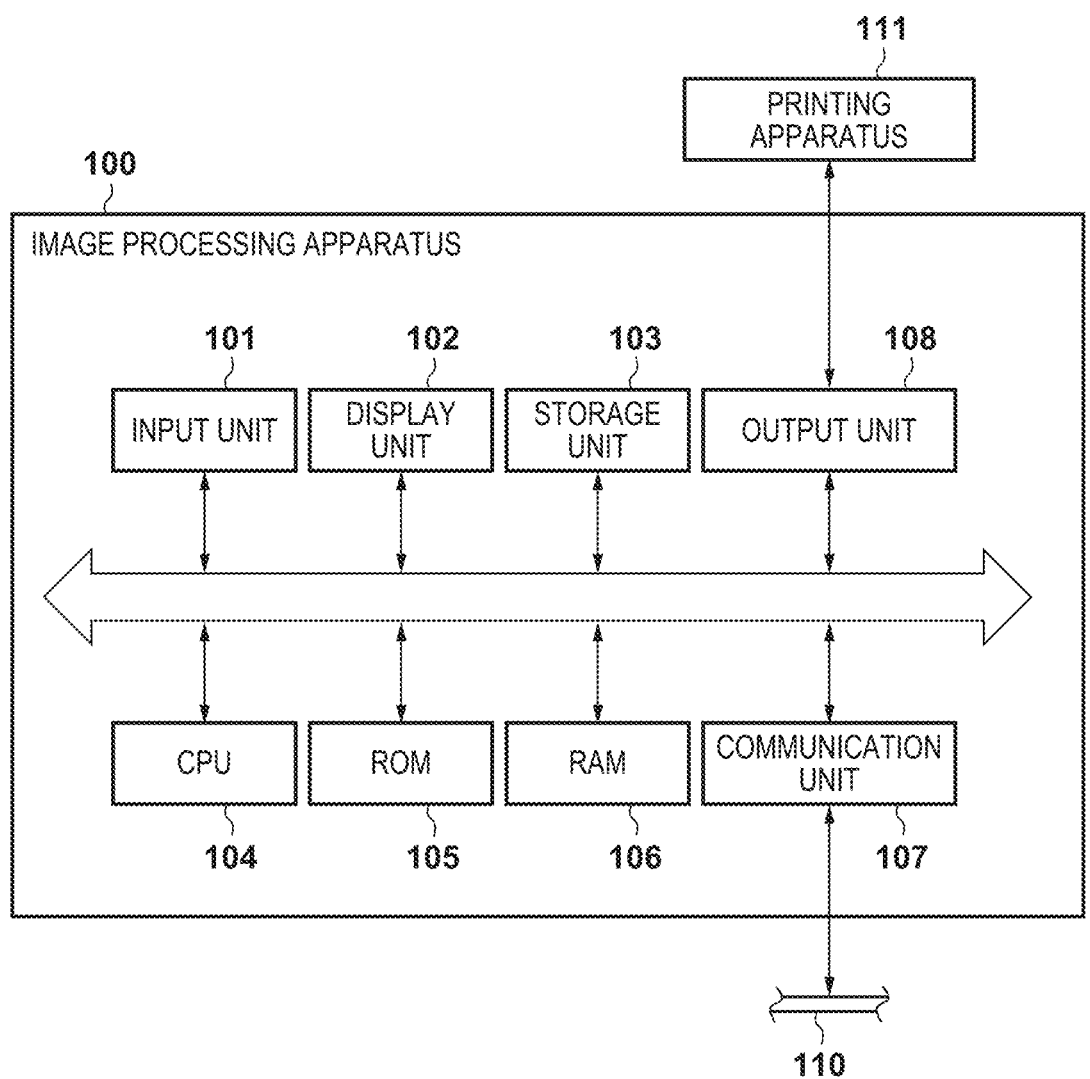
FIG. 1 is a block diagram illustrating an example of a hardware configuration of an image processing apparatus 100.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In the present embodiment, an image processing apparatus that determines whether it is necessary or possible for an image for printing to be moved to a printing position where a defect that occurs due to a defective nozzle in a nozzle row used for printing the image for printing is not conspicuous based on a "visual frequency response characteristic" of the image for printing will be described.

First, an example of a hardware configuration of an image processing apparatus 100 according to the present embodiment will be described with reference to the block diagram of FIG. 1. A computer apparatus such as a personal computer (PC), a tablet terminal apparatus, or a smartphone can be applied to the image processing apparatus 100 according to the present embodiment.

An input unit 101 is a serial bus interface such as a USB, and a user interface such as a keyboard or mouse can be connected to the input unit 101. Further, an image input device such as a memory card reader, a digital camera, or a scanner can be connected to the input unit 101.

A display unit 102 has a liquid crystal display screen or a touch panel screen, and can display the results of processing by a CPU 104 in the form of images, characters, or the like. Note that the display unit 102 may be a projection apparatus such as a projector that projects images or characters.

A storage unit 103 is a large-capacity information storage apparatus such as a hard disk drive (HDD) or a solid state drive (SSD). Computer programs, data, or the like for causing the CPU 104 to execute or control various processes described as being performed by an operating system (OS) and the image processing apparatus 100 are stored in the storage unit 103. The computer programs or data stored in the storage unit 103 are loaded into a RAM 106 as appropriate in accordance with control by the CPU 104, then are targeted for processing by the CPU 104.

An output unit 108 is a serial bus interface such as a USB, and outputs various types of data such as print data or images to devices such as a printing apparatus 111 or a memory card writer connected to the serial bus.

The CPU 104 executes various processes using computer programs and data stored in a ROM 105 or the RAM 106. As a result, the CPU 104 controls the operation of the entire image processing apparatus 100 and executes or controls various processes described as being performed by the image processing apparatus 100.

Setting data of the image processing apparatus 100, computer programs or data related to activation of the image processing apparatus 100, computer programs or data related to basic operations of the image processing apparatus 100, and the like are stored in the ROM 105.

The RAM 106 has an area for storing computer programs or data loaded from the storage unit 103 or the ROM 105, and an area for storing data received from the outside via the input unit 101. Also, the RAM 106 has an area for storing data received from the outside via the communication unit 107, and a work area used when the CPU 104 executes various processes. As described above, the RAM 106 can provide various areas as appropriate.

A communication unit 107 is a network interface for connecting to a wired or wireless network 110 such as Wi-Fi and P2P. The CPU 104 can communicate with a server apparatus and other computer devices on the network 110 through the communication unit 107. The CPU 104 can receive various computer programs or data from a server apparatus, other computer devices, and the like on the network 110, execute processing, and provide the processing results to the server apparatus or the other computer devices on the network 110. Note, the devices that the CPU 104 can communicate with via the communication unit 107 also include the printing apparatus 111, and various types of data can be transmitted to the printing apparatus 111 via the communication unit 107.

Also, in a case where a tablet terminal apparatus or a smartphone is used as the image processing apparatus 100, the display unit 102 may have a touch screen function, and in this case, the display unit 102 also functions as the input unit 101 for inputting a user instruction.

An example of a functional configuration of the image processing apparatus 100 is shown in a block diagram of FIG. 2. In the present embodiment, a case in which each functional unit illustrated in FIG. 2 is implemented by a computer program is described. Hereinafter, there are cases in which the functional units illustrated in FIG. 2 are described as the performers of the processing, but in practice, the functions of the functional units are realized by the CPU 104 executing a computer program corresponding to the functional unit. Note that one or more of each of the functional units illustrated in FIG. 2 may be implemented by hardware.

According to the present embodiment, processing performed by the image processing apparatus 100 for determining whether or not a printing position of an image for printing needs to be moved and whether or not the printing position can be moved will be described in accordance with the flowchart of FIG. 3.

In step S301, a first input unit 201 obtains an image for printing. The obtainment method and the obtainment source of the image for printing are not limited to a specific obtainment method and a specific obtainment source. For example, an image for printing stored in the storage unit 103 may be obtained from the RAM 106, or an image for printing received from the outside via the input unit 101 or the communication unit 107 may be obtained from the RAM 106. Hereinafter, a case in which the first input unit 201 obtains the image for printing shown in FIG. 4A is described. The image for printing shown in FIG. 4A is an image including subjects (trees) 401 having a high frequency texture and a subject (ground) 402 having a low frequency texture.

Here, one example of an image (print image) printed by the printing apparatus 111 on a printing medium such as paper based on the image for printing of FIG. 4A is illustrated in FIG. 4B. In the printhead of the printing apparatus 111, a nozzle row 403 is arranged in the X direction (a direction orthogonal to the conveyance direction of the printing medium) (that is, the X direction is the arrangement direction of the nozzle row 403), and when the printing medium is conveyed in the Y direction (the conveyance direction of the printing medium), an image is printed on the printing medium by ink droplet ejection from the nozzle row 403 onto the printing medium. In the present embodiment, as shown in FIG. 4B, due to the fact that a nozzle row 404, in which nozzles are arranged in consecutive positions in the nozzle row 403, are defective nozzles (a nozzle in which a discharge defect occurs due to mixing of air bubbles into the nozzle or clogging of the nozzle), a streak-like density unevenness 405, whose size in the X direction is the width of the nozzle row 404 and size in Y direction extends over the entire surface of the print image, occurs in the print image printed onto the printing medium.

In step S302, a second input unit 202 obtains defective nozzle information in which the positions of the defective nozzles in the nozzle row included in the printing apparatus 111 and the density change amount in the defective nozzles are held in association with each other. The obtainment method and the obtainment source of the defective nozzle information are not limited to a specific obtainment method and a specific obtainment source. For example, the defective nozzle information stored in the storage unit 103 may be obtained from the RAM 106, or defective nozzle information received from the outside via the input unit 101 or the communication unit 107 may be obtained from the RAM 106.

Figure 5A:
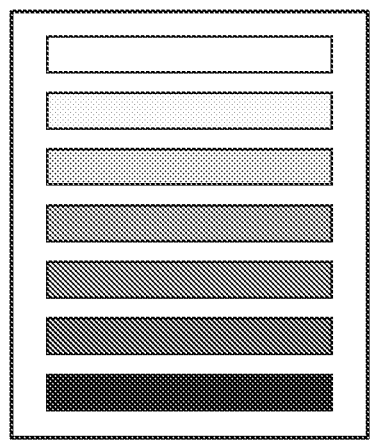
FIGS. 5A to 5C are views related to defective nozzle information.
Figure 5B:
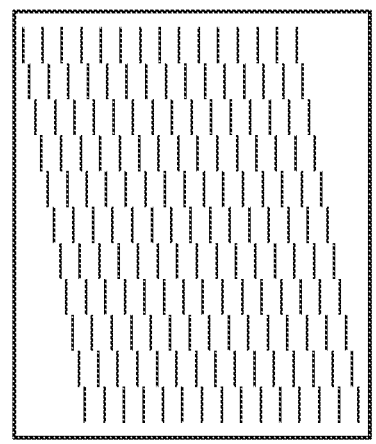

The defective nozzle information is generated, for example, as follows. First, an "image including a plurality of different gradation patches" exemplified in FIG. 5A and an "image including a discharge failure inspection pattern chart" illustrated in FIG. 5B are referred to as inspection images, and the printing apparatus 111 prints the inspection images on a printing medium. Then, read images obtained by the scanner reading the printing medium on which the inspection images have been printed are obtained. Then, the image processing apparatus 100 obtains, for each nozzle in the above nozzle row, a value obtained by multiplying the average value of the density ratio=(density value at the position of the read image)/(density value at the position of the inspection image) obtained for each position corresponding to the nozzle in the read image by 100, as the density change amount for that nozzle. The density change amount is obtained for each color component (e.g., C, M and K), but in the present embodiment, one color component is described in order to simplify the description. Then, the image processing apparatus 100 treats nozzles whose density change amount is equal to or less than a threshold value among the nozzles in the nozzle row as defective nozzles, and registers the position and the density change amount of the defective nozzles to the defective nozzle information.

Figure 5C:
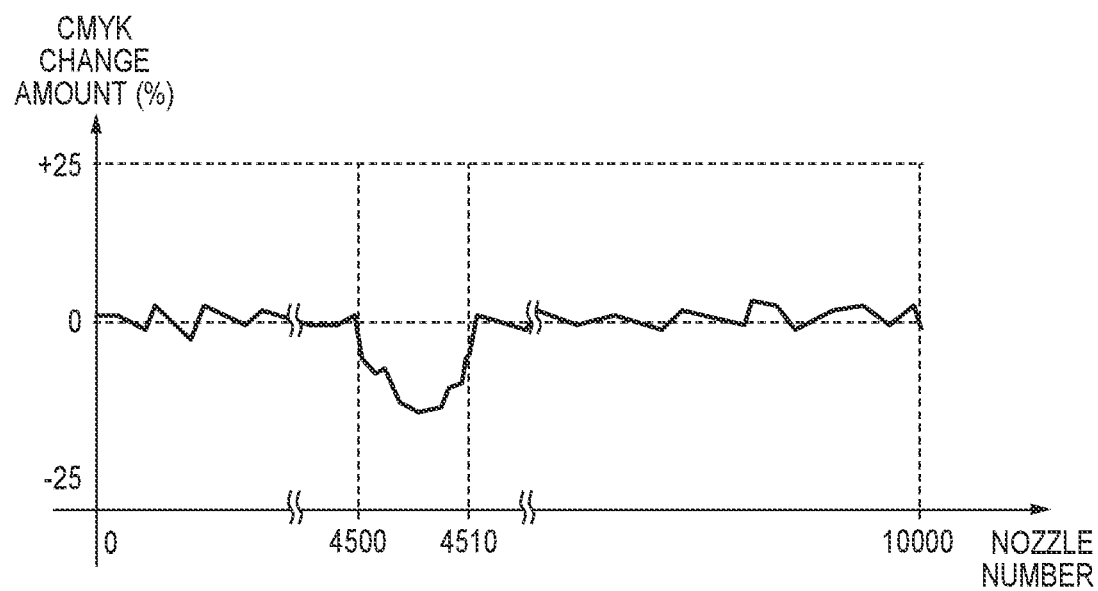

FIG. 5C is a view illustrating one example of a relationship between a position (nozzle number) of each nozzle in a nozzle row and a density change amount of the nozzles. In FIG. 5C, when X=(a density value at a position corresponding to a nozzle in the read image) and Y=(a density value at a position corresponding to a nozzle in the inspection image), a density change amount of a nozzle is defined as a value obtained by multiplying the average value of (X−Y)/Y for each position corresponding to a nozzle by 100. In the case of FIG. 5C, nozzles whose the density change amount is equal to or less than a threshold value (nozzles with low frequency density change amounts whose density changes to be lower) are nozzles with nozzle numbers of 4500 to 4510, and therefore the nozzles with the nozzle numbers of 4500 to 4510 are defective nozzles. Therefore, in this case, the defective nozzle information, in which the positions of the defective nozzles (nozzle numbers: 4500 to 4510) and the density change amount of the defective nozzles are held, is obtained.

Note that the criteria for determining which nozzle is a defective nozzle in the nozzle row, the method for generating the defective nozzle information, and the apparatus for generating the defective nozzle information are not limited to a specific form, and it is sufficient that defective nozzle information by which a position and a density change amount of a defective nozzle can be specified can be obtained.

Returning to FIG. 3, next, in step S303, a first determination unit 203 determines whether or not the printing position of the image for printing needs to be moved based on the image for printing obtained in step S301 and the defective nozzle information obtained in step S302. Details of the process in step S303 are described with reference to FIG. 6.

From the result of this determination, in a case where it is determined that the printing position of the image for printing needs to be moved, the process advances to step S305 via step S304. On the other hand, in a case where it is determined that the printing position of the image for printing does not need to be moved (unnecessary), the process advances to step S307 via step S304.

Figure 7:
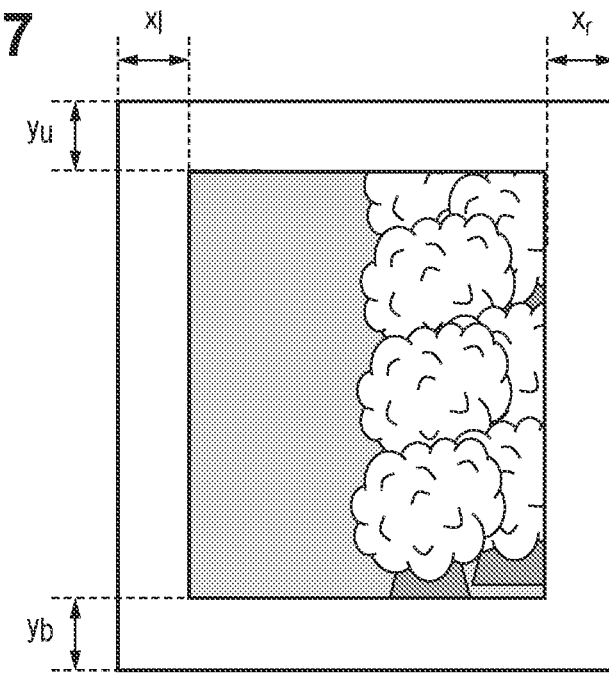
FIG. 7 is a view illustrating an example of a movable region.

In step S305, the calculation unit 204 specifies, from the print setting of the image for printing, a margin region a region where the image for printing is not printed on the printing medium) in the printing medium as a movable region. In the present embodiment, as shown in FIG. 7, a margin region in a width yu (pixel) from the upper end of the printing medium, a margin region in a width yb (pixel) from the lower end of the printing medium, a margin region in a width xl (pixel) from the left end of the printing medium, and a margin region in a width xr (pixel) from the right end of the printing medium are specified as movable regions from the print settings of the image for printing.

In step S306, a second determination unit 205 determines whether or not the printing position of the image for printing can be moved within a movable region based on the image for printing obtained in step S301 and the defective nozzle information obtained in step S302. Details of the process in step S306 are described with reference to FIG. 8.

Figure 9:
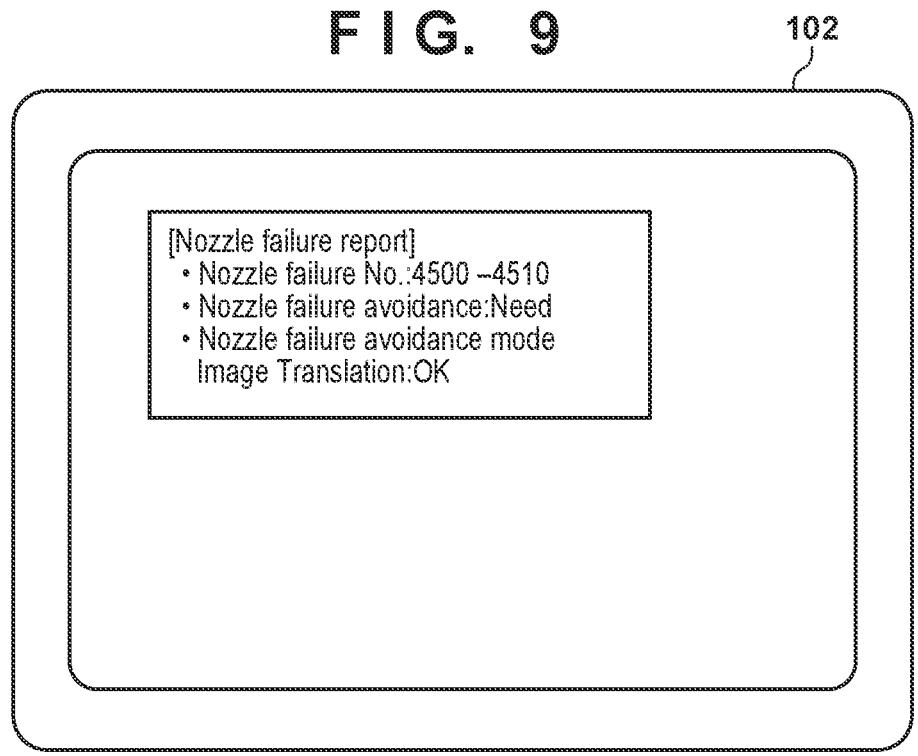
FIG. 9 is a view illustrating an example of a notification of a determination result.

In step S307, the notification unit 206 makes a notification of the results of the determinations in step S303 and step S306. For example, as shown in FIG. 9, the notification unit 206 causes the display unit 102 to display a screen including the nozzle numbers "4500-4510" of the defective nozzles, information "Need" indicating that the printing position of the image for printing needs to be moved, and information "OK" indicating that the printing position of the image for printing can be moved. Note that the contents to be displayed and the display form are not limited to a specific form. Note, in addition to or instead of such a display, the notification unit 206 may output the results of the determinations in step S303 and step S306 to the printing apparatus 111 to print the results of the determinations in step S303 and step S306 on the printing medium. In addition to or instead of these notifications, the notification unit 206 may transmit the results of the determinations in step S303 and step S306 to an external apparatus via the communication unit 107.

Figure 6:
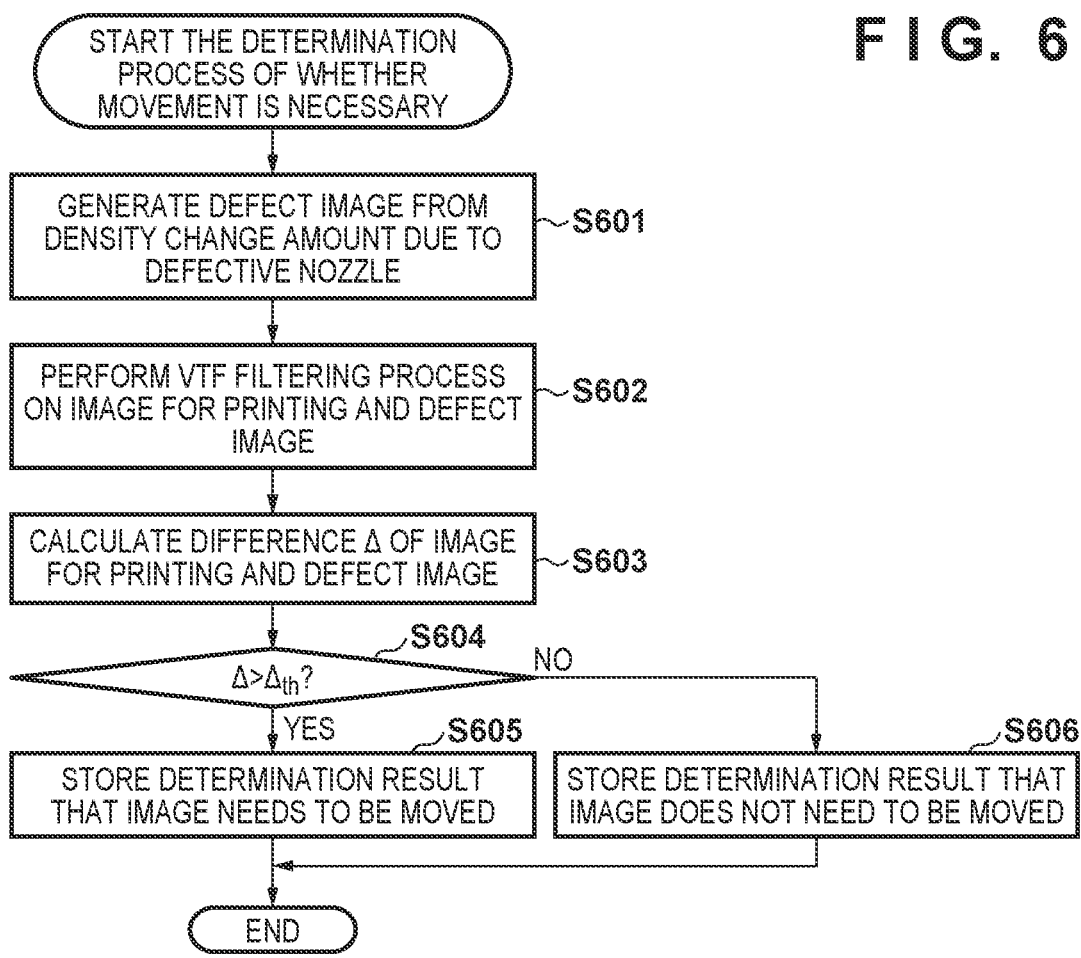
FIG. 6 is a flowchart illustrating details of the process of step S303.

Next, details of the process in the above-described step S303 are described according to the flowchart of FIG. 6. In step S601, the determination unit 203 generates, as a defect image, an image in which pixel values (density values) of corresponding pixel positions on the image for printing corresponding to the positions of each defective nozzle included in the defective nozzle information are changed in accordance with the density change amount of the defective nozzles included in the defective nozzle information.

Figure 10:
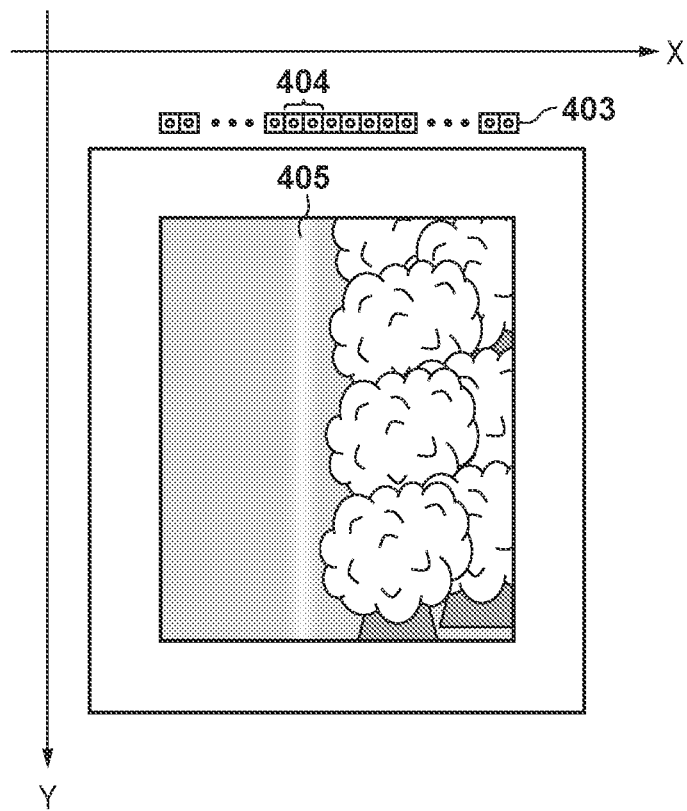
FIG. 10 is a view illustrating an example of a defect image.

As a result, for example, as shown in FIG. 10, a defect image, in which the streak-like density unevenness 405, whose size in the X direction is the width of the nozzle row 404, which are defective nozzles, and size in the Y direction extends over the entire surface of the image for printing, is imparted to the image for printing, is generated.

Figure 11:
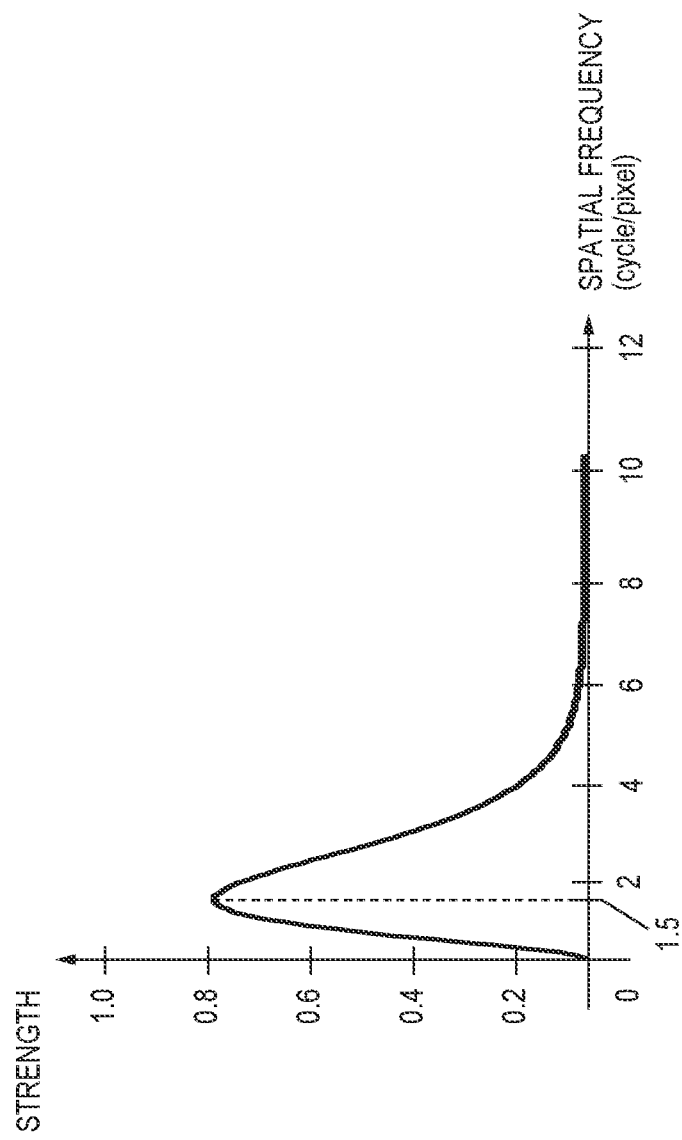
FIG. 11 is a view illustrating an example of a VTF curve representing a visual spatial frequency response characteristic.

In step S602, the determination unit 203 performs a Visual Transfer Function (VTF) filtering process on each of the image for printing and the defect image. The VTF filtering process is a process for performing a detection based on a visual frequency response characteristic. FIG. 11 shows a VTF curve representing a known visual spatial frequency response characteristic proposed by Dooley et al. The vertical axis represents a spatial frequency response strength, and the horizontal axis represents a spatial frequency (cycle/pixel). The VTF curve is a band-pass filter type spatial frequency response characteristic in which the most easily perceived contrast is at a spatial frequency around 1.5 cycles/pixel. In this embodiment, conspicuousness of a defect based on the visual frequency response characteristic is evaluated by performing the VTF filtering process on each of the image for printing and the detect image.

In this way, the determination unit 203 obtains the visual frequency response characteristic of the image for printing as a visual feature amount of the image for printing, and obtains a visual frequency response characteristic of the defect image as a visual feature amount of the defect image.

In step S603, the determination unit 203 generates a difference image between the image for printing (image P) on which the VTF filtering process has been performed and the defect image (image Q) on which the VTF filtering process has been performed. A pixel value of a pixel position (x, y) in the difference image is, for example, an absolute value of a difference between a pixel value of a pixel position (x, y) in the image P and a pixel value of a pixel position (x, y) in the image Q. Then, the determination unit 203 obtains the sum of the pixel values of all the pixels in the difference image as a difference $\Delta$.

In step S604, the determination unit 203 determines whether or not $\Delta > \Delta th$ is satisfied. $\Delta th$ is a predetermined threshold value, and in the present embodiment, for example, $\Delta th = 10$. As a result of the determination, in a case where $\Delta > \Delta th$ is satisfied, the process advances to step S605, and in a case where $\Delta > \Delta th$ is not satisfied, the process advances to step S606.

In step S605, the determination unit 203 determines that the image for printing needs to be moved so that the defect that occurs due the defective nozzles is not conspicuous, and then stores necessity result information indicating the result of the determination into the RAM 106 or the storage unit 103.

In step S606, the determination unit 203 determines that the image for printing does not need to be moved (unnecessary) in order to make the defect that occurs due to the defective nozzles not conspicuous, and then stores necessity result information indicating the result of the determination into the RAM 106 or the storage unit 103.

Figure 8:
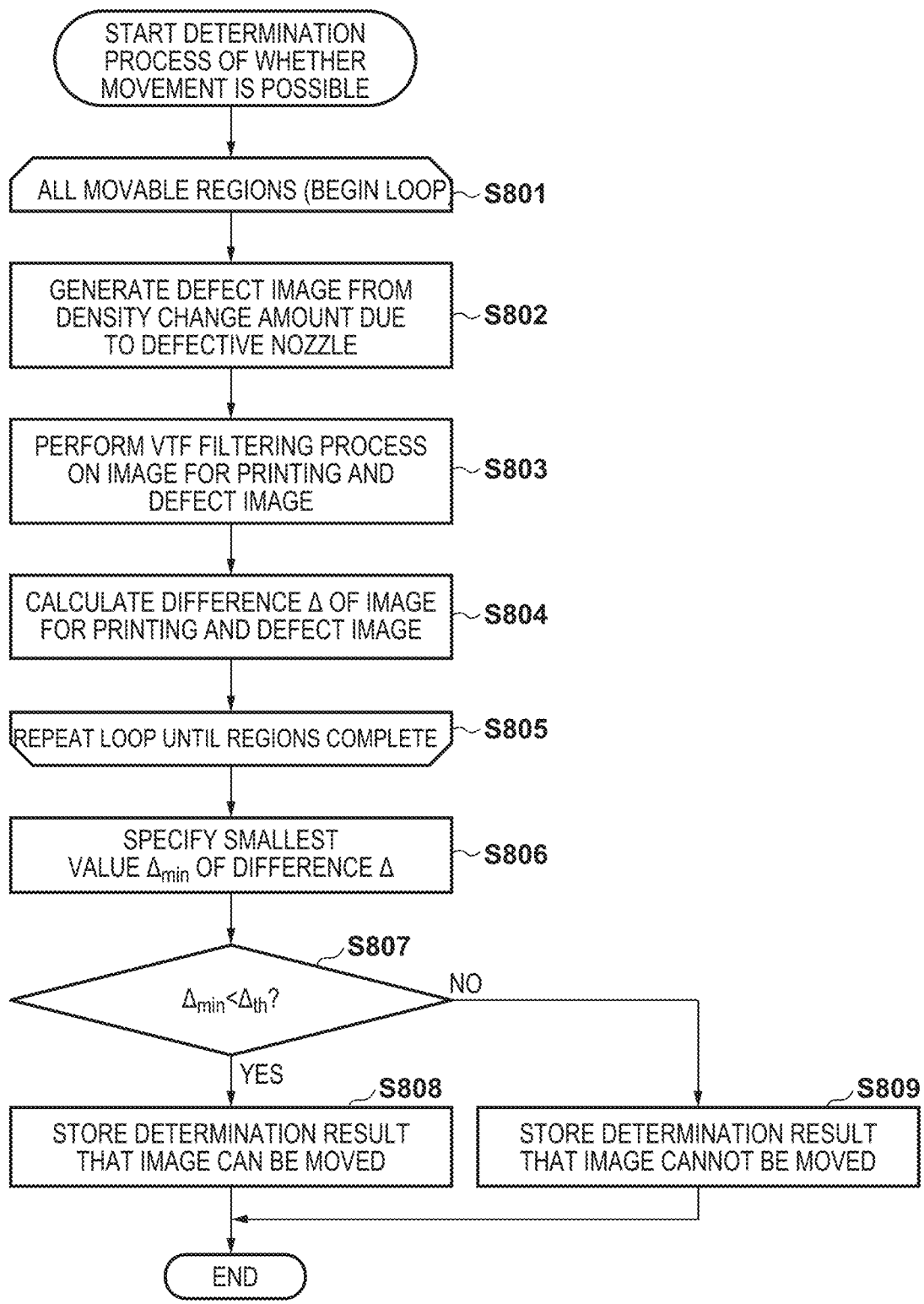
FIG. 8 is a flowchart illustrating details of the process of step S306.

Next, details of the process in the above-described step S306 will be described according to the flowchart of FIG. 8. Processing of step S801 to step S805 is performed on images for printing that are moved to respective positions with a spacing of $\Delta x$ between the left end and the right end of the printing medium so as not to protrude from the printing medium. That is, the processing of step S801 to step S805 is considered a process loop. Here, it is assumed that the initial value of a variable n is 2.

in step S802, the determination unit 205 arranges the image for printing at a position moved by $n\Delta x$ in the X-direction from the "printing position of the image for printing on the printing medium" indicated by the print setting, and then generates, as the defect image, an image, in which the pixel values of the corresponding positions on the defective image for printing corresponding to the positions of the defective nozzles indicated by the defective nozzle information are changed in accordance with the density change amount of the defective nozzles indicated by the defective nozzle information in the arranged image for printing. For example, the right end of the image for printing arranged at a position moved by $2\Delta x$ in the X direction from the "printing position of the image for printing on the printing medium" indicated by the print setting coincides with or is close to the right end of the printing medium.

in step S803, the determination unit 205 performs the VTF filtering process on each of the image for printing and the defect image generated in step S802. In step S804, similarly to step S603 described above, the determination unit 205 generates a difference image between the image for printing on which the VTF filtering process has been performed and the defect image on which the VTF filtering process has been performed, and then obtains the sum of the pixel values of all the pixels in the difference image as a difference $\Delta$.

Then, in step S805 the determination unit 205 decrements the value of the variable n by one, and in a case where the resulting value of the variable n is larger than $-3$, the process advances to step S802, and in a case where the value of the variable n is equal to $-3$, the process advances to step S806. In other words, the processing (loop) of step S801 to step S805 is performed for the values=2, 1, 0, $-1$, $-2$ of the variable n. For example, the left end of the image for printing arranged at a position moved by $-2\Delta x$ in the X direction from the "printing position of the image for printing on the printing medium" indicated by the print setting coincides with or is close to the left end of the printing medium. Note that $\Delta x$ indicates the movement spacing of the images for printing and can be arbitrarily changed, and in such a case, the possible range of values for the variable n can also be changed as appropriate.

Figure 12:
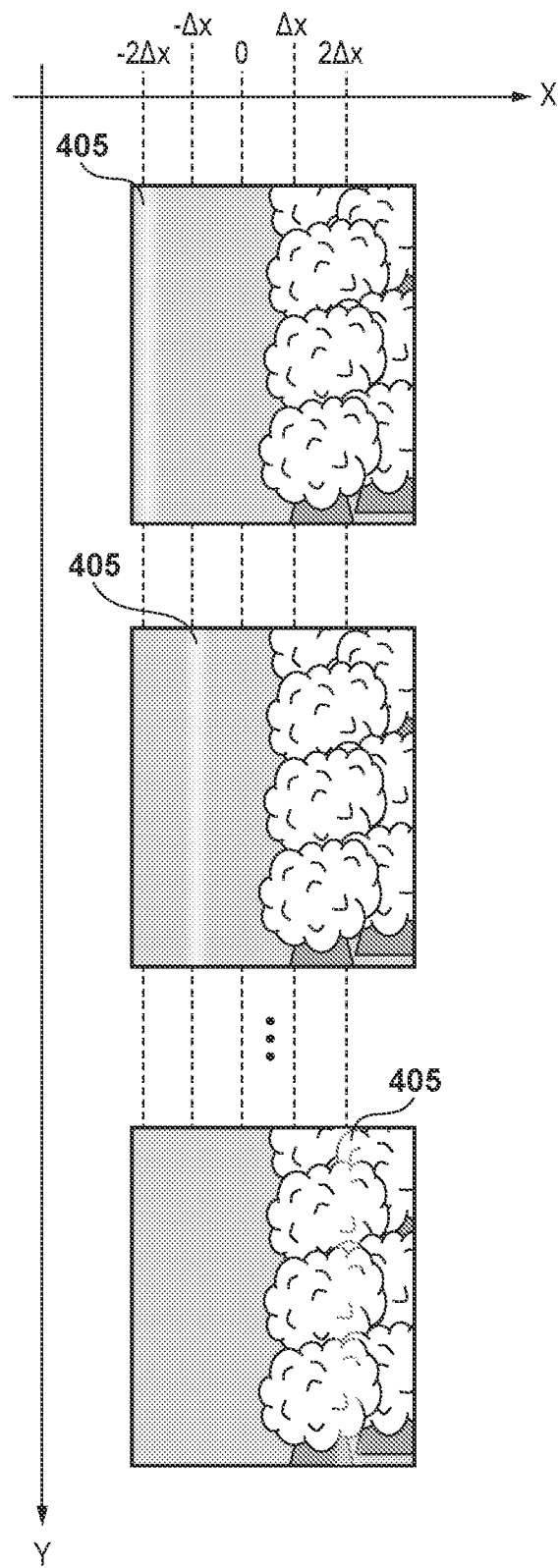
FIG. 12 is a view illustrating an example of a defect occurring in images for printing that have been moved.

The defect images thus obtained are described with reference to FIG. 12. When the position of the image for printing is moved as described above, the positions corresponding to the defective nozzles in the image for printing change. As shown in FIG. 12, in cases where the image for printing moves 2Δx, Δx, . . . , and −2Δx in the X direction along with the relative movement between the nozzle row 403 and the image for printing, the streak-like density unevenness 405 in the image for printing moves −2Δx, −Δx, . . . , and 2Δx in the X direction, and defect images, on which the density unevenness 405 is imparted, are generated at the different positions, respectively.

Figure 13:
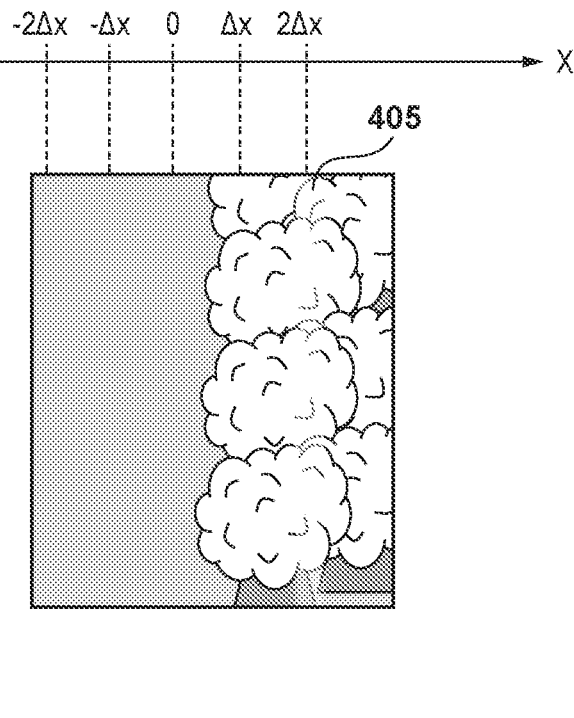
FIG. 13 is a view illustrating an example of a defect image in which a difference Δ is smallest.

In step S806, the determination unit 205 specifies the smallest difference Δ (Δmin) among each difference Δ obtained in the processing of step S801 to step S805. In the present embodiment, it is assumed that the difference Δ is the smallest in the defect image shown in FIG. 13 among the defect image group generated by the processing of step S801 to step S805 in a case where the image for printing is moved by −2Δx in the X direction, in other words, the density unevenness 405 is imparted at a position moved by 2Δx in the X direction. The difference Δ is the smallest since the streak-like density unevenness 405 of a low frequency having the width of the nozzle row 404 in the X direction that occurs due to defective ink discharge of the nozzle row 404 is not conspicuous on the subjects 401 having a high frequency texture on the right side of the image for printing.

In step S807, the determination unit 205 determines whether or not Δmin<Δth is satisfied. Δth may be the same as or different from the preceding Δth. As a result of the determination, in a case where Δmin<Δth is satisfied, the process advances to step S808, and in a case where Δmin<Δth is not satisfied, the process advances to step S809.

In step S808, the determination unit 205 determines that the image for printing can be moved to where the defect that occurs due to the defective nozzles is not conspicuous, and then stores, in the RAM 106 or the storage unit 103, the determination result and possible/impossible result information indicating the arrangement position of the image for printing corresponding to Δmin.

In step S809, the determination unit 205 determines that the image for printing cannot be moved to where the defect that occurs due to the defective nozzles is not conspicuous, and then stores possible/impossible result information indicating the result of the determination into the RAM 106 or the storage unit 103.

As described above, according to the present embodiment, it is possible to notify the user whether or not it is necessary and possible to move the image for printing to a position where a defect that occurs due to defective nozzles is not conspicuous, based on the visual frequency response characteristic of the image for printing.

Modification

In the present embodiment, defective nozzle information including the positions or density change amounts of defective nozzles detected from a chart print image such as gradation patches is obtained, and defect images are generated based on the defective nozzle information. However, the defect images are not limited to the ones generated in this manner, and for example, a defect image detected by an inspection process by comparing a print image to be inspected with an inspection reference image serving as a reference for inspection may be obtained. That is, the method for obtaining a defect image is not limited to a specific method.

In the present embodiment, although VFT filtering is used to evaluate the conspicuousness of defects, MTF filtering or Gaussian filtering of a scanner that scans print images may be substituted or these may be combined.

Further, in the present embodiment, it is determined whether or not a printing position of an image for printing needs to be moved with respect to the image for printing to be printed on a single surface. In a case of double-sided printing, it may be determined that "movement of the printing position is necessary" on both the front and back surface if it is determined that "movement of the printing position is necessary" on either one of the front or back surface.

Second Embodiment

In each of the following embodiments including the present embodiment, differences from the first embodiment are described, and it is assumed that descriptions are similar to the first embodiment unless specifically touched upon otherwise. In the first embodiment, a method of determining whether or not the image for printing needs to be moved, and whether or not it can be moved, to a position where a defect that occurs due to a defective nozzle is not conspicuous, based on the visual frequency response characteristic of the image for printing has been described. In contrast to this, in the present embodiment, a method of determining whether or not an image for printing needs to be moved, and whether or not it can be moved, to a position where a defect that occurs due to a defective nozzle is not conspicuous, based on a visual color response characteristic, is described.

Figure 14:
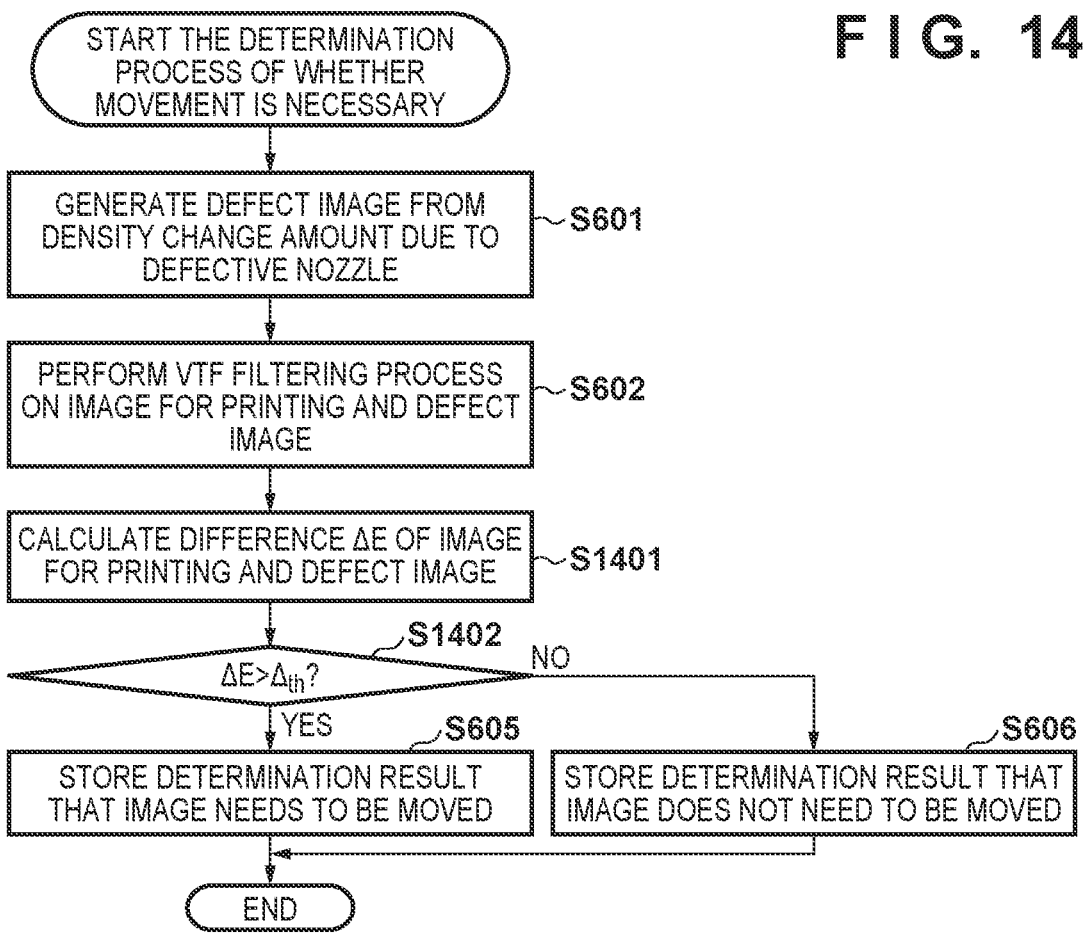
FIG. 14 is a flowchart illustrating details of the process of step S303.

In the present embodiment, the process according to the flowchart of FIG. 14 is performed in step S303 described above. In FIG. 14, similar processing steps to those in FIG. 6 are denoted by the same step numbers, and description for those processing steps is omitted or briefly described.

In the present embodiment, in step S301, the image for printing exemplified in FIG. 15A is obtained as the image for printing. In the image for printing shown in the FIG. 15A, a solid black image 1502 is arranged in the left region, and a solid yellow image 1501 is arranged in the right region.

When the image for printing shown in the FIG. 15A is printed (borderless printing) on the printing medium by the printing apparatus 111, due to a discharge failure of the nozzle 1503 which is one of the nozzles in the nozzle row 403 that discharges yellow ink, a thin line-shaped non-discharge streak 1504, whose size in the X direction is the width of the nozzle 1503 and whose size in the Y direction extends across the entire surface of the print image, occurs on the print image (the image printed on the printing medium based on the image for printing of FIG. 15A) as shown in FIG. 15B; such a print image is deemed a defect image. In the present embodiment, in step S601, the determination unit 203 generates a defect image from such an image for printing in a similar manner to that of the first embodiment.

In step S1401, the determination unit 203 converts the pixel values (RGB values) of the pixels in the image for printing (image P) on which the VTF filtering process has been performed into L*a*b* values by a known RGB-L*a*b* color space conversion. Similarly, the determination unit 203 converts the pixel values (RGB values) of the pixels in the defect image (image Q) on which the VTF filtering process has been performed into L*a*b* values by a known RGB-L*a*b* color space conversion. Then, the determination unit 203 generates a difference image between the image P on which the RGB-L*a*b* color space conversion has been performed and the image Q on which the RGB-L*a*b* color space conversion has been performed in a similar manner to the first embodiment, and obtains the sum of the pixel values of all the pixels in the generated difference image as a color difference ΔE.

In the examples of FIGS. 15A and 15B, RGB values are (R, G, B)=(230, 230, 160), and L*a*b* values are (L*, a*, b*)=(89.8, −10.6, 34.2) for the solid yellow image 1501 in the region on the right side of the image for printing. Further, RGB values are (R, G, B)=(48, 48, 48) and L*a*b* values are (L*, a*, b*)=(19.9, 0, 0) for the solid black image 1502 in the region on the left side of the image for printing. RGB values are (R, G, B)=(48, 48, 67) and L*a*b* values are (L*, a*, b*)=(20.6, 5.1, −11.9) for the non-discharge streak 1504 imparted in the defect image shown in FIG. 15B. An RGB difference is Δ=19 and a color difference is ΔE=13 between the solid image 1502 and the non-discharge streak 1504 in the black region on the left side of the defect image shown in FIG. 15B. In the present embodiment, by calculating the color difference ΔE between the image for printing and the defect image, it is possible to evaluate the conspicuousness of the defect based on the visual color response characteristics.

Returning to FIG. 14, next, in step S1402, the determination unit 203 determines whether or not Δ>Δth is satisfied. Δth max be the same as or different from the preceding Δth. In the present embodiment, for example, Δth=10. As a result of the determination, in a case where ΔE>Δth is satisfied, the process advances to step S605, and in a case where ΔE>Δth is not satisfied, the process advances to step S606.

Figure 16:
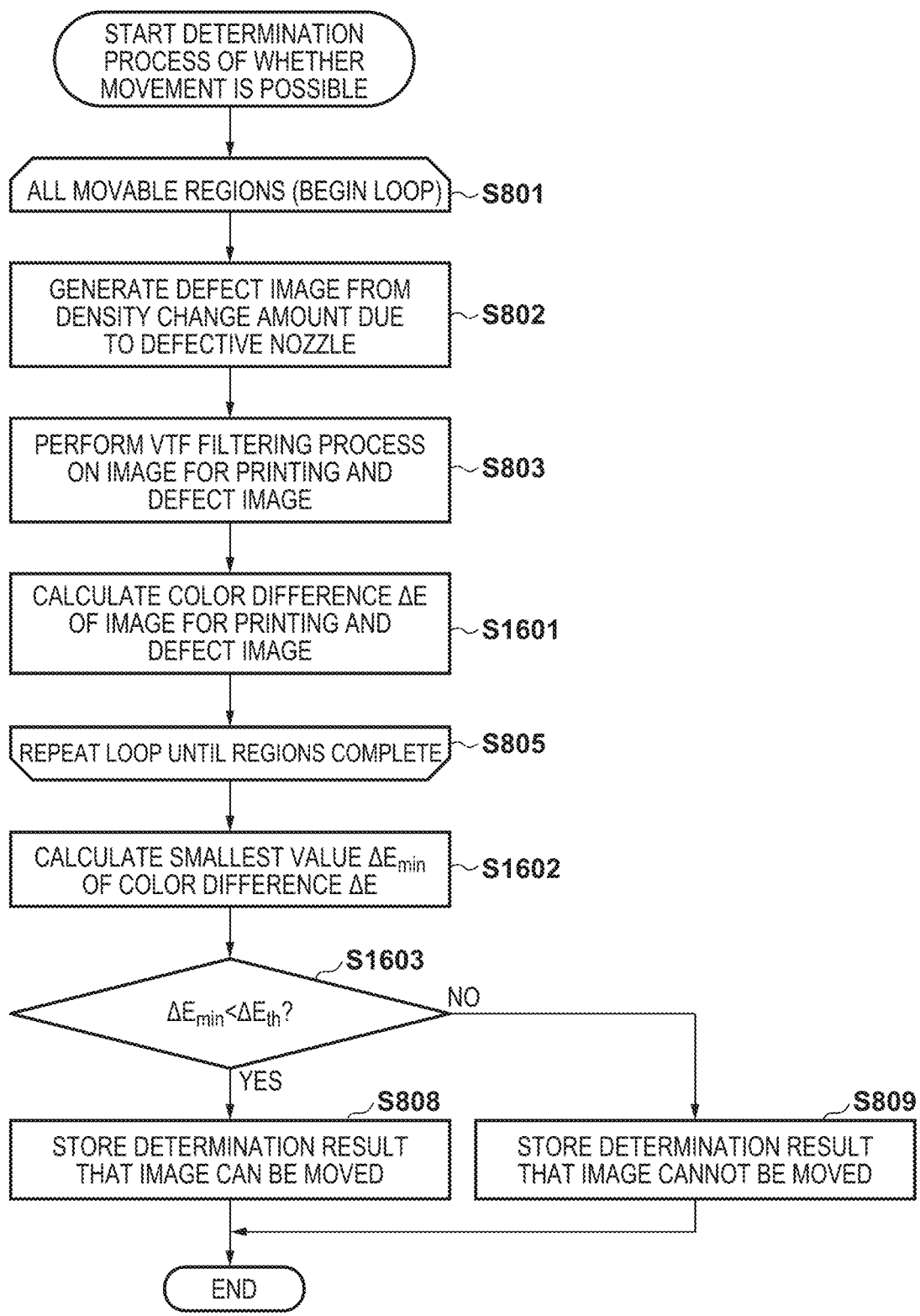
FIG. 16 is a flowchart illustrating details of the process of step S306.

Also, in the present embodiment, the process according to the flowchart of FIG. 16 is performed in step S306 described above. In FIG. 16, similar processing steps to those in FIG. 8 are denoted by the same step numbers, and description for those processing steps is omitted or briefly described.

In the present embodiment, in order to perform borderless printing of the image for printing shown in FIG. 15A, the calculation unit 204, in step S305, obtains, as the movable region, regions where the image for printing is rotated by the rotational angles 0°, 90°, 180°, and 270°. Therefore, in the present embodiment, the processing of step S801 to step S805 is performed on an image for printing rotated by each rotational angle of 0°, 90°, 180°, and 270°.

Therefore, in step S802, the defect images shown in FIGS. 17A to 17D, in which the thin line-shaped non-discharge streak 1504 that occurs due to a discharge failure of the nozzle 1503 that discharges yellow ink is imparted in the image for printing on which a layout change by a rotation of 0°, 90°, 180°, or 270° is performed, are generated.

More specifically, the determination unit 205 generates an image, in which the pixel values (density values) of the corresponding pixel positions on the image for printing (a 0° rotated (no rotation) image for printing) corresponding to the positions of each defective nozzle included in the defective nozzle information in accordance with the density change amounts of the defective nozzles included in the defective nozzle information are changed, as a defect image corresponding to the 0° rotated (no rotation) image for printing.

More specifically, the determination unit 205 generates, as a defect image corresponding to a 90° rotated image for printing, an image in which the pixel values (density values) of the corresponding pixel positions on the image for printing (the 90° rotated image for printing) corresponding to the positions of each defective nozzle included in the defective nozzle information are changed in accordance with the density change amounts of the detective nozzles included in the defective nozzle information.

More specifically, the determination unit 205 generates, as a detect image corresponding to a 180° rotated image for printing, an image in which the pixel values (density values) of the corresponding pixel positions on the image for printing (the 180° rotated image for printing) corresponding to the positions of each defective nozzle included in the defective nozzle information are changed in accordance with the density change amounts of the defective nozzles included in the defective nozzle information.

More specifically, the determination unit 205 generates, as a defect image corresponding to a 270° rotated image for printing, an image in which the pixel values (density values) of the corresponding pixel positions on the image for printing (the 270° rotated image for printing) corresponding to the positions of each defective nozzle included in the defective nozzle information are changed in accordance with the density change amounts of the defective nozzles included in the defective nozzle information.

In step S1601, the determination unit 205 converts the pixel values (RGB values) of the pixels in the image for printing (image P) on which the VTF filtering process has been performed into L*a*b* values in a similar manner to that of step S1401 described above. Similarly, the determination unit 203 converts the pixel values (RGB values) of the pixels in the defect image (image Q) on which the VTF filtering process has been performed into L*a*b* values.

In this way, the determination unit 203 obtains a visual color response characteristic of the image for printing as a visual feature amount of that image for printing, and obtains a visual color response characteristic of the defect image as a visual feature amount of that defect image.

Then, the determination unit 203 generates a difference image between the image P on which the RGB-L*a*b* color space conversion has been performed and the image Q on which the RGB-L*a*b* color space conversion has been performed in a similar manner to that of the first embodiment, and obtains the sum of the pixel values of all the pixels in the generated difference image as a color difference ΔE.

Figure 17:
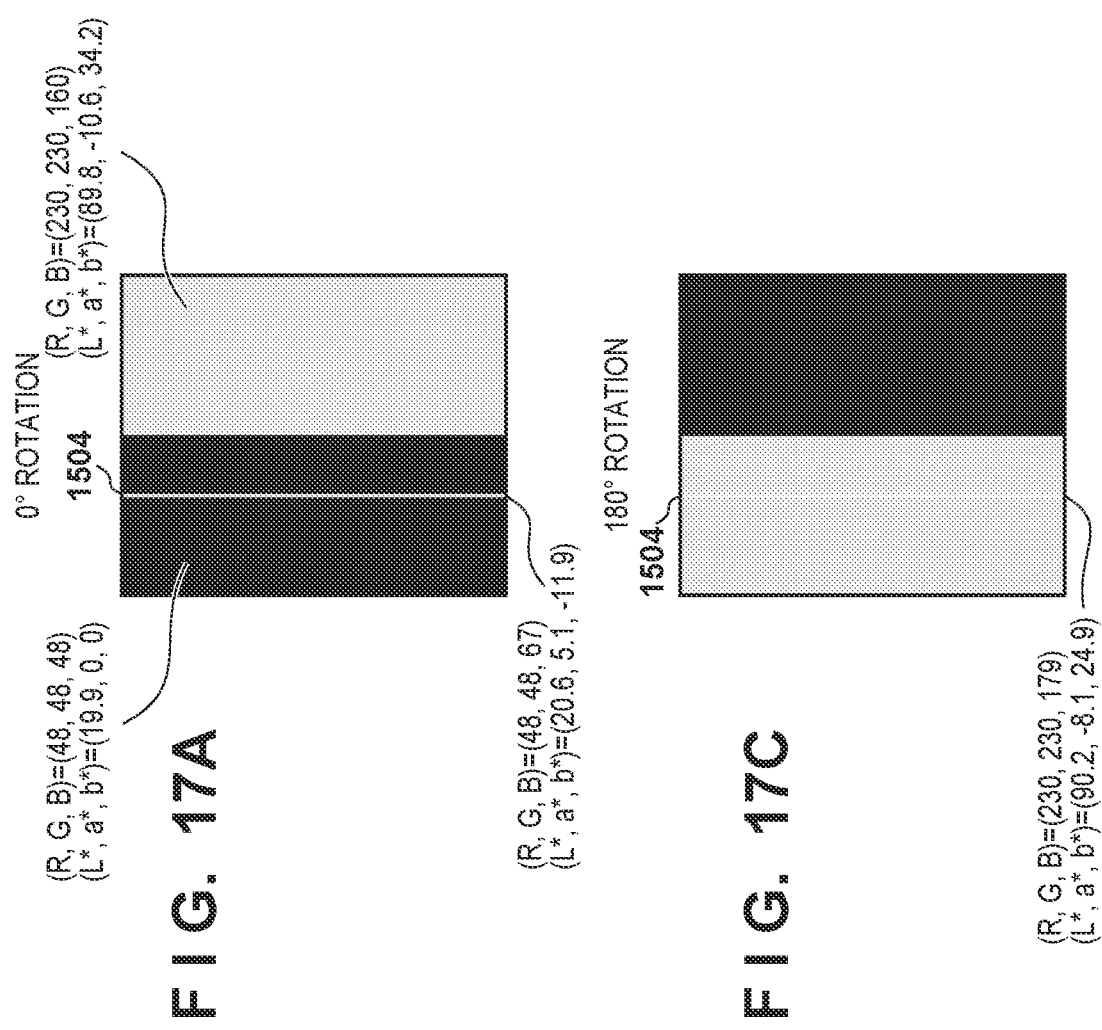
FIGS. 17A to 17D are views illustrating an example of a defect occurring in an image for printing whose layout has been changed.

As shown in FIG. 17A, the RGB values of the non-discharge streak 1504 imparted in the solid black image in the image for printing rotated by 0° are (R, G, B)=(48, 48, 67), and the L*a*b* values (L*, a*, b*)=(20.6, 5.1, −11.9). As shown in FIG. 17C, the RGB values of the non-discharge streak 1504 imparted in the solid yellow image in the image for printing rotated by 180° are (R, G, B)=(230, 230, 179), and the L*a*b* values (L*, a*, b*)=(90.2, −8.1, 24.9). An RGB difference is Δ=19 and a color difference is ΔE=13 between the solid black image and the non-discharge streak 1504 in the image for printing rotated by 0° as shown in FIG. 17A. Also, an RGB difference is Δ=19 and a color difference is ΔE=9.6 between the solid yellow image and the non-discharge streak 1504 in the image for printing rotated by 180° as shown in FIG. 17C.

In the present embodiment, by calculating the color difference ΔE between the image for printing and the defect images, it is possible to evaluate the conspicuousness of the defect based on the visual color response characteristic even between defect images having the same RGB difference Δ as shown in the FIGS. 17A and 17C.

Figure 18:
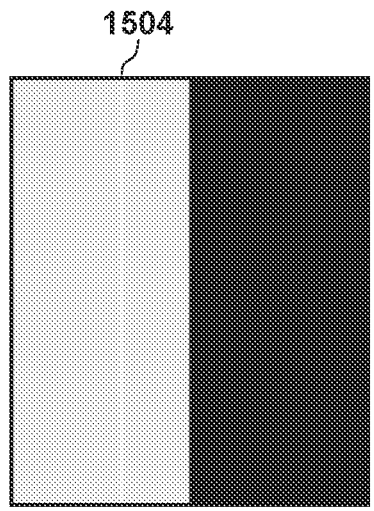
FIG. 18 is a view illustrating an example of a defect image in which a color difference ΔE is smallest.

In step S1602, the determination unit 205 specifies the smallest difference Δ (ΔEmin) among each color difference ΔE obtained in the processing of step S801 to step S805. In the present embodiment, it is assumed that the difference ΔE is smallest in the defect image shown in FIG. 18 in which the non-discharge streak 1504 is imparted to the image for printing rotated by 180° which is one of the group of defect images generated by the processing of step S801 to step S805.

The color difference ΔE is smallest since the thin line-shaped non-discharge streak 1504, that occurs due to the discharge failure of the nozzle 1503 that discharges the yellow ink, is not conspicuous on the solid yellow image 1501 in the region on the right side of the image for printing.

In step S1603, the determination unit 205 determines whether or not ΔEmin<ΔEth is satisfied. ΔEth may be the same as or different from the preceding Δth. As a result of the determination, in a case where ΔEmin<ΔEth is satisfied, the process advances to step S808, and in a case where ΔEmin<ΔEth is not satisfied, the process advances to step S809.

Figure 19:
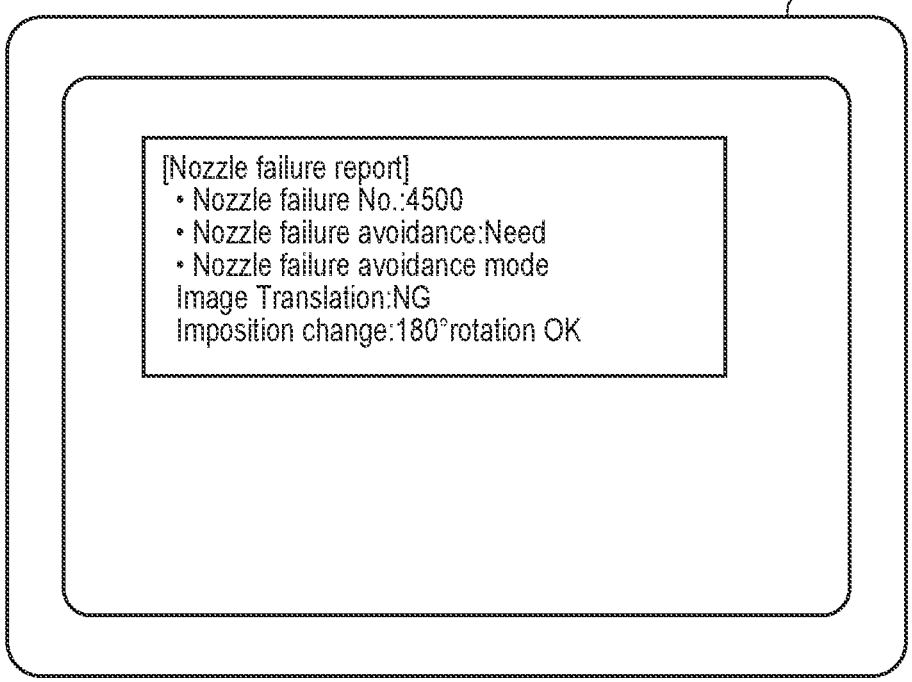
FIG. 19 is a view illustrating an example of a notification of a determination result.

In the present embodiment, as shown in FIG. 19, for example, the notification unit 206 causes the display unit 102 to display a screen including the nozzle number "4500" of a defective nozzle, the information "Need" indicating that the printing position of the image for printing needs to be moved, the information "NG" indicating that the printing position of the image for printing is not in a parallel movement mode as in the first embodiment, the information "180°" indicating the rotational angle of the image for printing, and the information "OK" indicating that the image for printing can be rotated.

As described above, according to the present embodiment, it is possible to notify the user whether or not it is necessary and possible to move the image for printing to a printing position where a defect that occurs due to a defective nozzle is not conspicuous, based on the visual color response characteristic.

Third Embodiment

In the first and second embodiments, a method of making a notification of whether or not the image for printing needs to be moved, and whether or not it can be moved, to a printing position where a defect that occurs due to a defective nozzle is not conspicuous, based on a visual characteristic is described. In the present embodiment, in a case where it is determined that the image for printing is movable, an occurrence of a new defective nozzle accompanying a recovery operation is avoided and the frequency of executions of recovery operations is reduced by making a notification of a stoppage of the recovery operation of the defective nozzle until printing based on the print job has ended in the printing apparatus.

Figure 20:
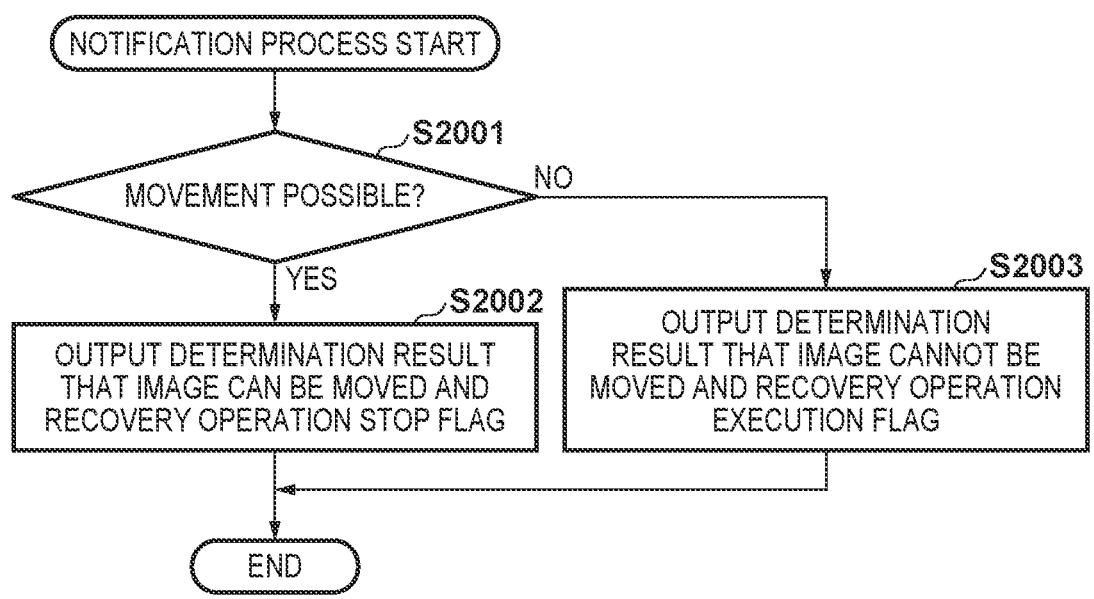
FIG. 20 is a flowchart illustrating details of the process of step S307.

In the present embodiment, the process according to the flowchart of FIG. 20 is performed in step S307 described above. In step S2001, the notification unit 206 refers to possible/impossible result information stored in the RAM 106 or the storage unit 103 to determine whether or not the possible/impossible result information indicates that the image for printing can be moved. As a result of this determination, in a case where the possible/impossible result information indicates that the image for printing can be moved, the process advances to step S2002, and in a case where the possible/impossible result information indicates that the image for printing cannot be moved, the process advances to step S2003.

In step S2002, the notification unit 206 causes the display unit 211 to display a screen including various types of information including a stop flag value indicating that the recovery operation is to be stopped until the print job ends. For example, as shown in FIG. 21A, the notification unit 206 causes the display unit 102 to display a screen including the nozzle numbers "4500-4510" of the defective nozzles, the information "Need" indicating that the printing position of the image for printing needs to be moved, the information "NG" indicating that the printing position of the image for printing is not in the parallel movement mode as in the first embodiment, the information "180°" indicating the rotational angle of the image for printing, the information "OK" indicating that the image for printing can be rotated, and a stop flag value "Pause until job is done" indicating that the recovery operation is stopped until the print job has ended.

In step S2003, the notification unit 206 causes the display unit 211 to display a screen including various types of information including a stop flag value indicating that stopping the recovery operation until the print job ends is not to be performed. For example, as shown in FIG. 21B, the notification unit 206 causes the display unit 102 to display a screen including the nozzle numbers "4500-4510" of the defective nozzles, the information "Need" indicating that the printing position of the image for printing needs to be moved, the information "NG" indicating that the printing position of the image for printing is not in the parallel movement mode as in the first embodiment, the information "NG" indicating that the image for printing cannot be rotated, and a stop flag value "Active" indicating that the recovery operation is not to be stopped until the print job has ended.

Figure 21A:
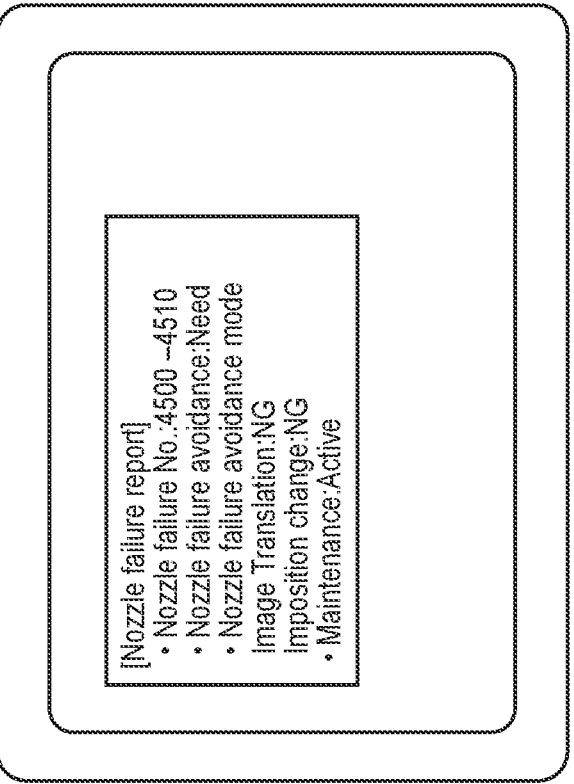
FIGS. 21A and 21B are views illustrating examples of a notification of a determination result.
Figure 21B:
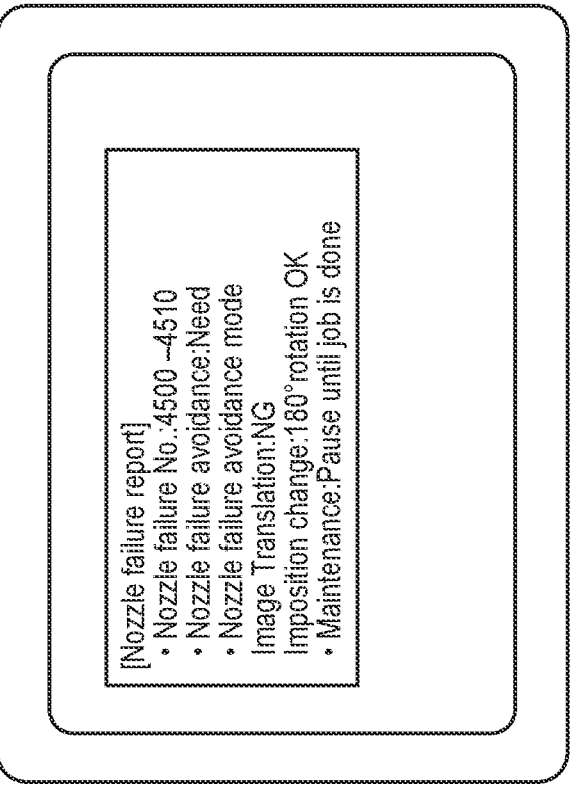

Note that also in the present embodiment, the method of notifying various types of information including the stop flag value is not limited to a specific notification method, and the information to be notified is not limited to the examples shown in FIGS. 21A and 21B.

Further, the image processing apparatus 100 may make a notification to the printing apparatus 111 of such a stop flag and cause the printing apparatus 111 to control the execution of the recovery operation according to the value of that stop flag. As described above, according to the present embodiment, it is possible to avoid an occurrence of a new defective discharge nozzle accompanying a recovery operation, and to reduce the frequency of executions of recovery operations.

Fourth Embodiment

In the present embodiment, a method of determining whether or not an image for printing can be moved based on the visual feature amount calculated for images for printing on both surfaces even in cases where the printing apparatus prints an image for printing on both surfaces of the printing medium is described.

Figures 23A, 23B:
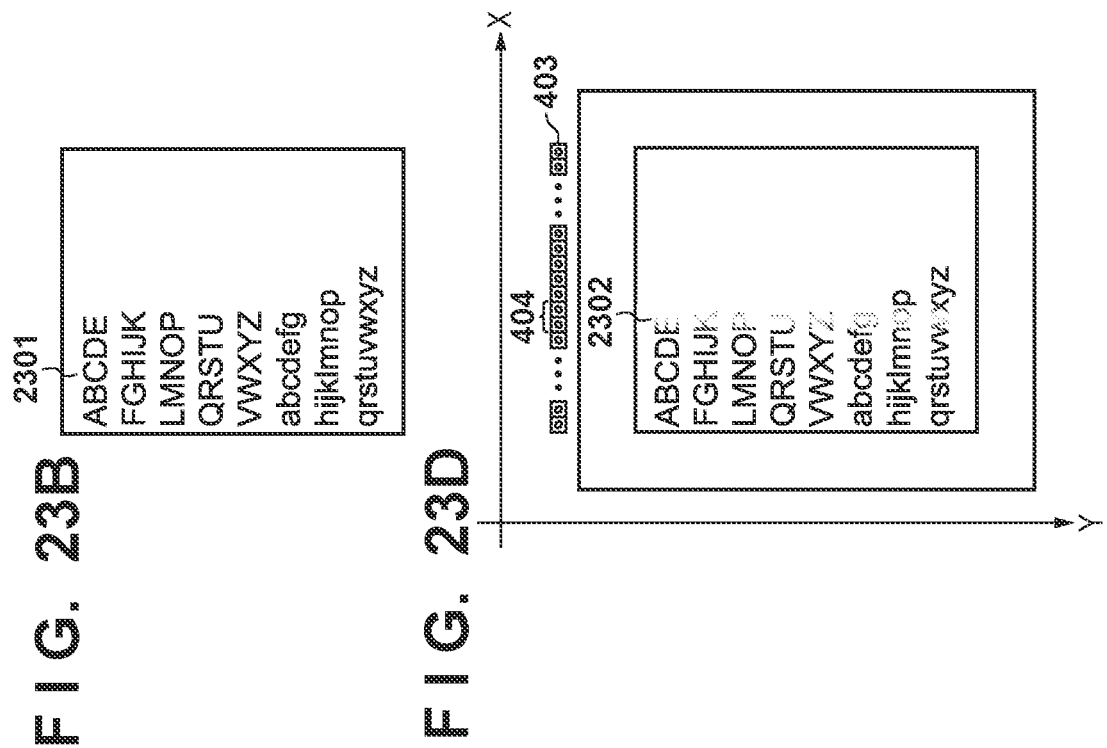
FIGS. 23A to 23D are views illustrating an image for printing and an example of a defect that occurred due to a defective nozzle.

In the present embodiment, in step S301, an image for printing on a front surface exemplified in FIG. 23A is obtained as the image for printing to be printed on the front surface of the printing medium, and an image for printing on a back surface exemplified in the FIG. 23B is obtained as the image for printing to be printed on the back surface of the printing medium.

The image for printing on a front surface shown in FIG. 23A is an image similar to the image for printing shown in FIG. 4A. The image for printing on a back surface shown in FIG. 23B is an image in which a region on the right side is a blank region (blank sheet) and a region on the left side is a region in which character strings 2301 are arranged.

Figures 23C, 23D:
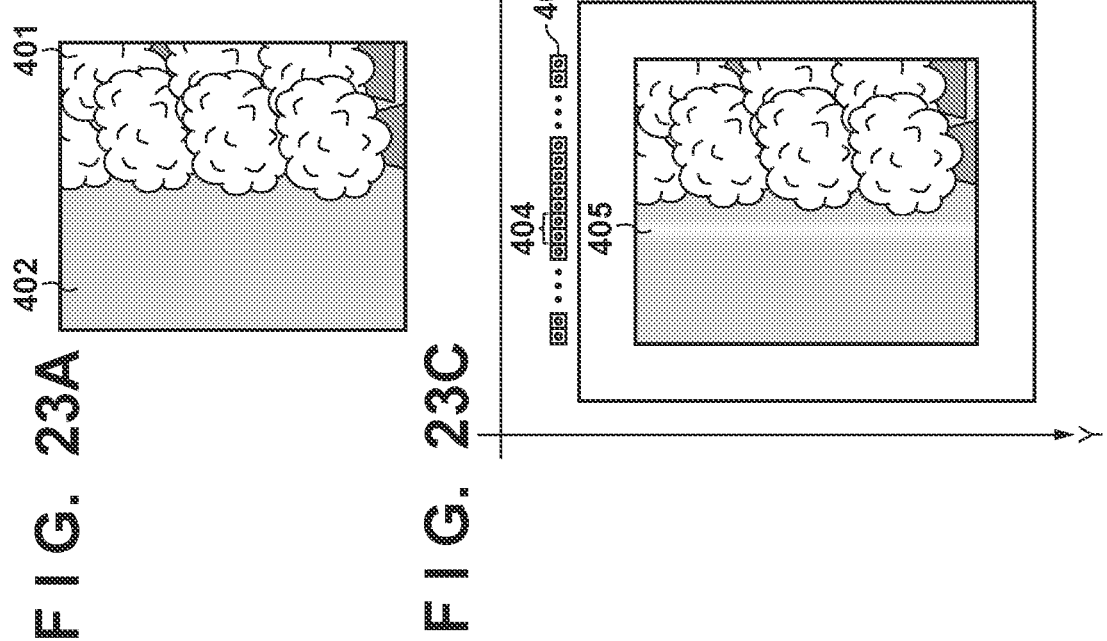

One example of an image (print image) printed by the printing apparatus 111 on the front surface of a printing medium based on the image for printing on the front surface of FIG. 23A is illustrated in FIG. 23C. In the present embodiment, as shown in FIG. 23C, due to the fact that the nozzle row 404, in which nozzles are arranged in consecutive positions in the nozzle row 403, are defective nozzles, the streak-like density unevenness 405, whose size in the X direction is the width of the nozzle row 404 and size in Y direction extends over the entire surface of the print image, occurs in the print image printed onto the front surface of the printing medium.

One example of an image (print image) printed, by the printing apparatus 111, on the back surface of a printing medium based on the image for printing on the back surface of FIG. 23B is illustrated in FIG. 23D. In the present embodiment, as shown in FIG. 23D, due to the fact that a nozzle row 404, in which nozzles are arranged in consecutive positions in the nozzle row 403, are defective nozzles, the streak-like density unevenness 2302, whose size in the X direction is the width of the nozzle row 404 and size in Y direction extends over the entire surface of the print image, occurs in the print image printed onto the back surface of the printing medium.

Then, the process of step S303 described in the first embodiment is performed for each of the image for printing on the front surface and the image for printing on the back surface. Also, in a case where it is determined that the printing position needs to be moved for at least one of the image for printing on the front surface and the image for printing on the back surface, the process advances to step S305 via step S304. On the other hand, in a case where it is determined that the printing position of the image for printing does not need to be moved (unnecessary) for both the image for printing on the front surface and the image for printing on the back surface, the process advances to step S307 via step S304. Note, configuration may also be taken such that the processing advances to step S305 via step S304 in a case where it is determined that the printing position needs to be moved for both the image for printing on the front surface and the image for printing on the back surface.

Figure 22:
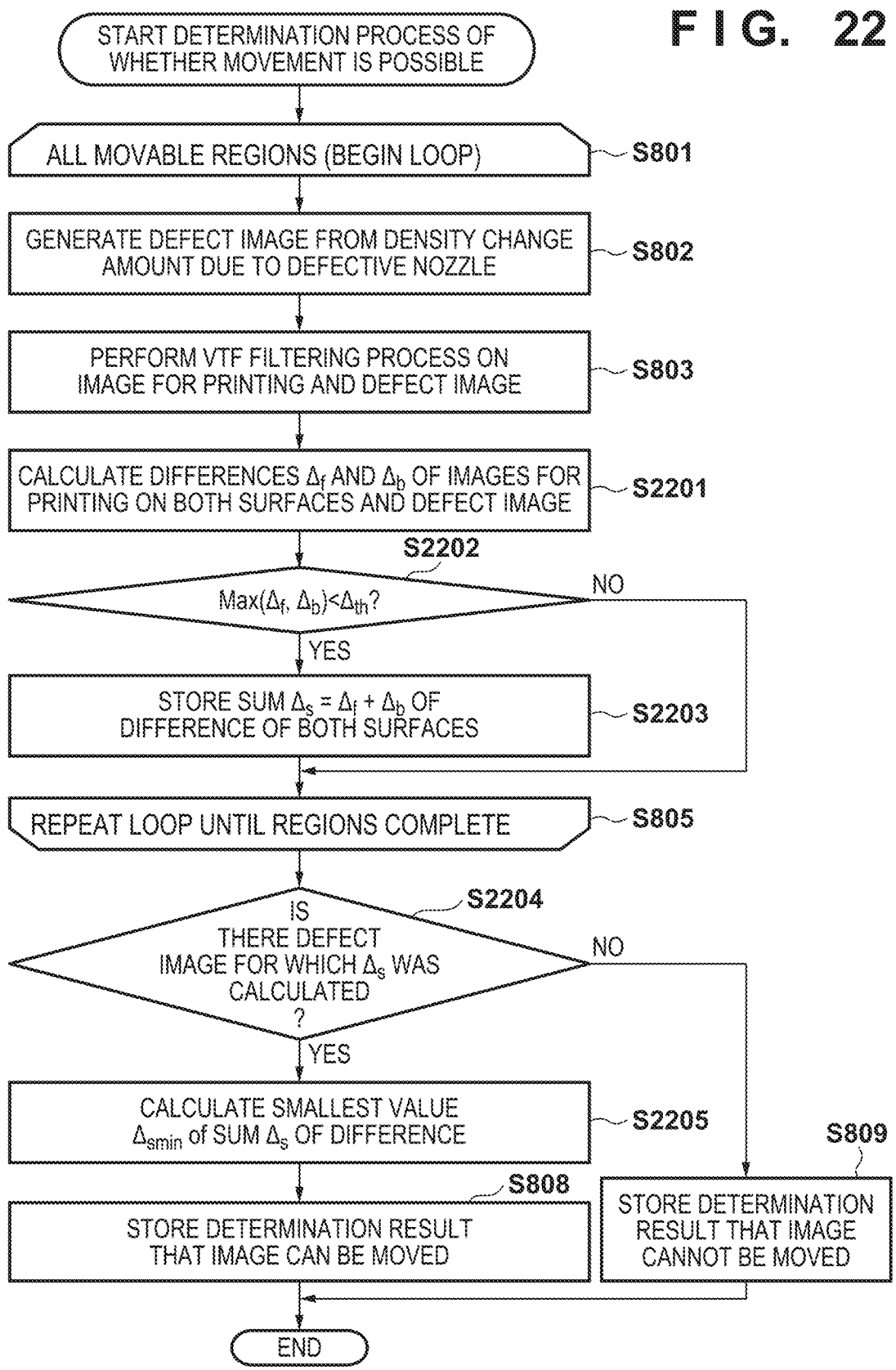
FIG. 22 is a flowchart illustrating details of the process of step S306.

In the present embodiment, the process according to the flowchart of FIG. 22 is performed in step S306 described above. In FIG. 22, similar processing steps to those in FIG. 8 are denoted by the same step numbers, and description for those processing steps is omitted or briefly described.

In the present embodiment, in step S802, the determination unit 205 generates a defect image in a similar manner to that of the first embodiment for each of the image for printing on the front surface and the image for printing on the back surface. The defect image thus obtained is described with reference to FIGS. 24A and 24B.

Figure 24A:
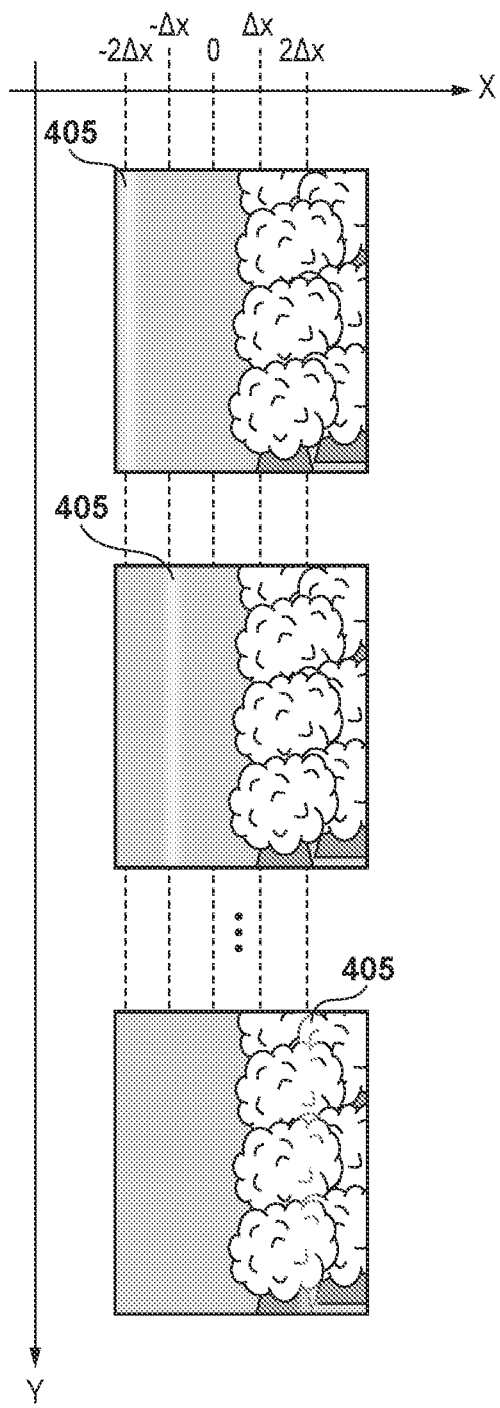
FIGS. 24A and 24B are views illustrating an example of a defect occurring in images for printing that have been moved.

Regarding the defect images generated from the image for printing on the front surface as illustrated in FIG. 24A, in a case where the image for printing on the front surface moves 2Δx, Δx, . . . , and −2Δx in the X direction along with the relative movement between the nozzle row 403 and the image for printing on the front surface, the streak-like density unevenness 405 in the image for printing on the front surface moves −2Δx, −Δx, . . . , and 2Δx in the X direction, and defect images, on which the density unevenness 405 is imparted to the each of the different positions, are generated.

Figure 24B:
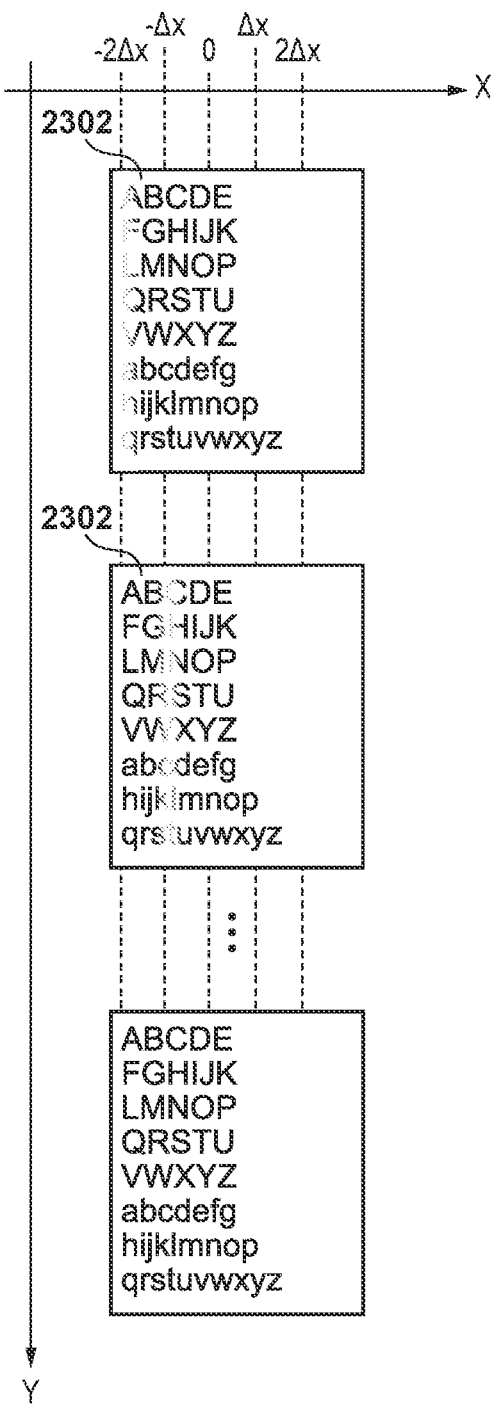

Regarding the defect images generated from the image for printing on the back surface as illustrated in FIG. 24B, in a case where the image for printing on the back surface moves 2Δx, Δx, . . . , and −2Δx in the X direction along with the relative movement between the nozzle row 403 and the image for printing on the back surface, the streak-like density unevenness 405 in the image for printing on the back surface moves −2Δx, −Δx, . . . , and 2Δx in the X direction, and defect images, on which the density unevenness 2302 is imparted to the each of the different positions, are generated.

In the present embodiment, in step S803, the determination unit 205 performs the VTF filtering process on each of the image for printing on the front surface, the image for printing on the back surface, and the defect images generated in step S802.

In step S2201, the determination unit 205 generates a difference image between the image for printing on the front surface on which the VTF filtering process is performed and the defect image on which the VTF filtering process is performed (the defect image generated from the image for printing on the front surface), and obtains the sum of the pixel values of all the pixels in the difference image as a difference Δf. Also, the determination unit 205 generates a difference image between the image for printing on the back surface on which the VTF filtering process is performed and the defect image on which the VTF filtering process is performed (the defect image generated from the image for printing on the back surface), and obtains the sum of the pixel values of all the pixels in the difference image as a difference Δb.

In step S2202, the determination unit 205 determines whether or not the difference Δf and the difference Δb satisfy Max(Δf, Δb)<Δth. Max(a, b) is a function that returns the larger value out of a and b. Also, Δth may be the same as or may be different from the above-described Δth.

As a result of this determination, in a case where the difference Δf and the difference Δb satisfy Max(Δf, Δb)<Δth', the process advances to step S2203. On the other hand, in a case where the difference Δf and the difference Δb do not satisfy Max(Δf, Δb)<Δth', if the value of the variable n is larger than −3, the process advances to step S802, and if the value of the variable n is equal to −3, the process advances to step S2204.

In step S2203, the determination unit 205 calculates Δs=Δf+Δb, and stores Δs obtained by the calculation into the RAM 106 or the storage unit 103. In step S2204, the determination unit 205 determines whether or not at least one Δs is stored in the RAM 106 or the storage unit 103, that is, whether or not there is a defect image for which Δs has been calculated. As a result of this determination, in a case where at least one Δs is stored in the RAM 106 or the storage unit 103 (a defect image for which Δs has been calculated is present), it is determined that both of the image for printing on the front surface and the image for printing on the back surface can be moved to where defects that occur due to the defective nozzles are not conspicuous, and the process advances to step S2205. On the other hand, in a case where not even one Δs is stored in the RAM 106 or the storage unit 103 (a defect image for which Δs has been calculated is not present), the process advances to step S809.

In step S2205, the determination unit 205 specifies the smallest Δs (Δsmin) among Δs stored in the RAM 106 or the storage unit 103. In the present embodiment, it is assumed that the difference Δs is the smallest among the defect image group generated by the processing of step S801 to step S805 in the detect images shown in FIGS. 25A and 25B in a case where the image for printing on the front surface and the image for printing on the back surface are moved by −2Δx in the X direction, in other words, the density unevenness is imparted at a position moved by 2Δx in the X direction. FIG. 25A shows a defect image in which Δs is the smallest among the defect image group generated from the image for printing on the front surface, and FIG. 25B shows a defect image in which Δs is the smallest among the defect image group generated from the image for printing on the back surface.

As shown in FIG. 25A, the streak-like density unevenness 405 of a low frequency having the width of the nozzle row 404 in the X-direction that occurs due to defective ink discharge of the nozzle row 404 is not conspicuous on the subjects 401 having the high frequency texture on the right side of the image for printing on the front surface. Also, as shown in FIG. 25B, the streak-like density unevenness 2302 of a low frequency having the width of the nozzle row 404 in the X-direction that occurs due to defective ink discharge of the nozzle row 404 is not conspicuous on the blank region of the right side of the image for printing on the back surface. As a result, Δs, which is the sum of Δf corresponding to the image for printing on the front surface and Δb corresponding to the image for printing on the back surface is Δsmin.

As described above, according to the present embodiment, even in cases where the printing apparatus prints an image on both surfaces of the printing medium, it is possible to notify the user whether or not it is necessary and possible to move, based on the visual feature amount calculated for the image for printing on both surfaces, the images for printing to a position where a defect that occurs due to the defective nozzle is not conspicuous.

Fifth Embodiment

In the first to fourth embodiments, cases in which the image processing apparatus 100 and the printing apparatus 111 are separate apparatuses have been described, but the image processing apparatus 100 may be incorporated in the printing apparatus 111 and integrated. In this case, the printing apparatus 111 can notify the user whether or not it is necessary and possible to move the printing position of an image for printing to be printed thereafter by the functions of the image processing apparatus 100 described above. Note, the printing apparatus 111 may further include a function (scanning function) for reading an image or a character formed on a printing medium.

Also, numerical values, processing timings, processing orders, performers of processing, transmission destinations/transmission sources/storage locations of data (information), and the like used in the each of the above-described embodiments are given as examples for the purpose of concrete description, and the invention is not intended to be limited to such examples.

In addition, some or all of the above-described embodiments may be appropriately combined and used. Furthermore, a part or all of each embodiment described above may be selectively used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-069592, filed Apr. 20, 2022, which is hereby incorporated by reference herein in its entirety.

What is claimed is:

1. An image processing apparatus, comprising:
at least one processor and at least one memory configured to function as:
an obtainment unit configured to obtain a density unevenness image in which uneven density caused by a defective nozzle in a nozzle row for discharging ink occurs in an image for printing;
a determination unit configured to determine whether a printing position of the image for printing needs to be moved based on a feature amount in each of the image for printing and the density unevenness image; and
a notification unit configured to make a notification, in a case where it has been determined that movement of the printing position of the image for printing is possible, that a recovery operation of the defective nozzle is to be stopped until printing based on a print job has ended.

2. The image processing apparatus according to claim 1, wherein the obtainment unit generates, based on a density change amount of the defective nozzle in the nozzle row, a density unevenness image in which uneven density according to the density change amount at a position corresponding to the defective nozzle has been imparted in the image for printing.

3. The image processing apparatus according to claim 1, wherein the determination unit determines that the printing position of the image for printing needs to be moved in a case where a difference between a visual feature amount of the image for printing and a visual feature amount of the density unevenness image is greater than a threshold value.

4. The image processing apparatus according to claim 1, wherein the determination unit determines that the printing position of the image for printing does not need to be moved in a case where a difference between a visual feature amount of the image for printing and a visual feature amount of the density unevenness image is equal to or less than a threshold value.

5. The image processing apparatus according to claim 1, wherein the at least one processor and at least one memory are further configured to function as a possible/impossible determination unit configured to determine whether the printing position of the image for printing can be moved based on differences between visual feature amounts of a plurality of density unevenness images in which uneven density, caused by the defective nozzle, is imparted in the image for printing arranged at respective positions along the nozzle row and the visual feature amount of the image for printing.

6. The image processing apparatus according to claim 5, wherein the possible/impossible determination unit determines that movement of the printing position of the image for printing is possible if a smallest difference among the differences is less than a threshold value.

7. The image processing apparatus according to claim 1, further comprising a possible/impossible determination unit configured to determine whether the printing position of the image for printing can be moved based on differences between visual feature amounts of a plurality of density unevenness images in which uneven density, caused by the defective nozzle, is imparted in the image for printing rotated by different rotational angles and the visual feature amount of the image for printing.

8. The image processing apparatus according to claim 7, wherein the possible/impossible determination unit determines that movement of the printing position of the image for printing is possible if a smallest difference among the differences is less than a threshold value.

9. The image processing apparatus according to claim 1, wherein the obtainment unit obtains a first density unevenness image in which uneven density is imparted in a front image for printing to be printed on a front surface of a printing medium and a second density unevenness image in which uneven density is imparted in a back image for printing to be printed on a back surface of the printing medium; and
  the determination unit determines that the printing positions of the front image for printing and the back image for printing need to be moved in a case where a difference between a visual feature amount of the front image for printing and a visual feature amount of the first density unevenness image and/or a difference between the visual feature amount of the back image for printing and a visual feature amount of the second density unevenness image are/is greater than a threshold value.

10. The image processing apparatus according to claim 1, wherein the obtainment unit obtains a first density unevenness image in which uneven density is imparted in a front image for printing to be printed on a front surface of a printing medium and a second density unevenness image in which uneven density is imparted in a back image for printing to be printed on a back surface of the printing medium; and
  the determination unit determines that the printing positions of the front image for printing and the back image for printing do not need to be moved in a case where a difference between a visual feature amount of the front image for printing and a visual feature amount of the first density unevenness image and a difference between the visual feature amount of the back image for printing and a visual feature amount of the second density unevenness image are less than a threshold value.

11. The image processing apparatus according to claim 9, further comprising:
  a unit configured to, for each of an image for printing to be printed on a front surface of the printing medium and an image for printing to be printed on a back surface of the printing medium, obtain differences between visual feature amounts of a plurality of density unevenness images in which uneven density, caused by the defective nozzle, is imparted in the image for printing arranged at each position along the nozzle row and the visual feature amount of the image for printing, and based on the differences, determine whether printing positions of the image for printing to be printed on the front surface of the printing medium and the image for printing to be printed on the back surface of the printing medium can be moved.

12. The image processing apparatus according to claim 9, further comprising:
  a unit configured to, for each of an image for printing to be printed on the front surface of the printing medium and an image for printing to be printed on the back surface of the printing medium, obtain differences between visual feature amounts of a plurality of density unevenness images in which uneven density, caused by the defective nozzle, is imparted in the image for printing rotated by different rotational angles and the visual feature amount of the image for printing, and based on the differences, determine whether printing positions of the image for printing to be printed on the front surface of the printing medium and the image for printing to be printed on the back surface of the printing medium can be moved.

13. The image processing apparatus according to claim 1, wherein the feature amount is a visual frequency response characteristic.

14. The image processing apparatus according to claim 1, wherein the feature amount is a visual color response characteristic.

15. An image processing method that an image processing apparatus performs, the image processing method comprising:
  obtaining a density unevenness image in which uneven density caused by a defective nozzle in a nozzle row for discharging ink occurs in an image for printing;
  determining whether a printing position of the image for printing needs to be moved based on a feature amount in each of the image for printing and the density unevenness image; and
  making a notification, in a case where it has been determined that movement of the printing position of the image for printing is possible, that a recovery operation of the defective nozzle is to be stopped until printing based on a print job has ended.

16. A non-transitory computer-readable storage medium storing a computer program to cause at least one processor and at least one memory to function as:
  an obtainment unit configured to obtain a density unevenness image in which uneven density caused by a defective nozzle in a nozzle row for discharging ink occurs in an image for printing;
  a determination unit configured to determine whether a printing position of the image for printing needs to be moved based on a feature amount in each of the image for printing and the density unevenness image; and
  a notification unit configured to make a notification, in a case where it has been determined that movement of the printing position of the image for printing is possible, that a recovery operation of the defective nozzle is to be stopped until printing based on a print job has ended.

* * * * *